United States Patent
Hiraishi et al.

(10) Patent No.: US 8,150,010 B2
(45) Date of Patent: Apr. 3, 2012

(54) PHONE COMMUNICATION CONTROLLING METHOD

(75) Inventors: Tatsuya Hiraishi, Kawasaki (JP); Tatsuo Yagi, Sapporo (JP); Hidenori Tonosaki, Kawasaki (JP); Takeyasu Tomioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 975 days.

(21) Appl. No.: 12/131,299

(22) Filed: Jun. 2, 2008

(65) Prior Publication Data

US 2008/0304642 A1 Dec. 11, 2008

(30) Foreign Application Priority Data

Jun. 5, 2007 (JP) ................................. 2007-149440

(51) Int. Cl.
*H04M 1/56* (2006.01)
*H04M 15/00* (2006.01)
(52) U.S. Cl. .......... 379/142.09; 379/142.04; 379/142.17
(58) Field of Classification Search ................ 379/88.2, 379/88.21, 93.17, 93.23, 142.01, 142.02, 379/142.03, 142.04, 142.06, 142.09, 142.17, 379/245, 247; 455/415
See application file for complete search history.

(56) References Cited

U.S. PATENT DOCUMENTS

| | | | |
|---|---|---|---|
| 2007/0081649 A1* | 4/2007 | Baudino et al. | 379/201.11 |
| 2007/0116219 A1* | 5/2007 | Nasiri et al. | 379/142.01 |
| 2007/0149179 A1 | 6/2007 | Kashiwabara | |
| 2008/0089501 A1* | 4/2008 | Benco et al. | 379/142.01 |
| 2008/0096536 A1 | 4/2008 | Tonosaki et al. | |

FOREIGN PATENT DOCUMENTS

| | | |
|---|---|---|
| JP | 9-233187 | 9/1997 |
| JP | 2007-49429 | 2/2007 |
| JP | 2008-109223 | 5/2008 |
| WO | 2005/120027 | 12/2005 |

OTHER PUBLICATIONS

Japanese Office Action dated May 24, 2011, from the corresponding Japanese Application No. 2007-149440.

* cited by examiner

*Primary Examiner* — Binh Tieu

(74) *Attorney, Agent, or Firm* — Katten Muchin Rosenman LLP

(57) ABSTRACT

According to an aspect of the embodiment provides a communication terminal for communicating in a network. The terminal receives from another communication terminal a request includes an obscured call information for obscuring an identification information. The communication terminal obscures the identification information after receiving the request.

8 Claims, 22 Drawing Sheets

FIG. 4

PHONE NUMBER STORAGE TABLE

| IDENTIFICATION NUMBER | NAME | PHONE NUMBER |
|---|---|---|
| 1 | JOHN SMITH | 090-1111-1111 |
| 2 | BOB SMITH | 090-1111-2222 |
| 3 | BILL SMITH | 090-1111-3333 |
| 4 | XX SMITH | 090-1111-4444 |
| 5 | YY SMITH | 090-1111-5555 |
| .. | .. | .. |
| .. | .. | .. |

FIG. 5

| CALL INFORMATION STORAGE TABLE | |
|---|---|
| CALLER NAME | JANE SMITH |

FIG. 6

USER IDENTIFICATION INFORMATION STORAGE TABLE

| IDENTIFICATION NUMBER | CALLER NAME | PHONE NUMBER |
|---|---|---|
| 1 | JANE SMITH | 090-2222-1111 |
| 2 | MARY SMITH | 090-2222-2222 |
| 3 | AAA SMITH | 090-2222-3333 |
| 4 | BBB SMITH | 090-2222-4444 |
| 5 | CCC SMITH | 090-2222-5555 |
| .. | .. | .. |
| .. | .. | .. |

FIG. 11

USER IDENTIFICATION INFORMATION STORAGE TABLE

| IDENTIFICATION NUMBER | CALLER NAME | PHONE NUMBER | EXPIRATION DATE |
|---|---|---|---|
| 1 | JANE SMITH | 090-2222-1111 | 2010/4/1 |
| 2 | MARY SMITH | 090-2222-2222 | 2006/12/31 |
| 3 | AAA SMITH | 090-2222-3333 | - |
| 4 | BBB SMITH | 090-2222-4444 | 2007/4/1 |
| 5 | CCC SMITH | 090-2222-5555 | 2010/4/1 |
| .. | .. | .. | .. |
| .. | .. | .. | .. |
| | | | |

FIG. 17
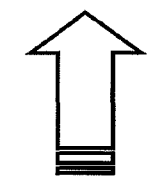
OPERATION OF
FIX OF INPUT
TARGET FOR REGISTERING INTO USER IDENTIFICATION TABLE
OPERATION OF
REGISTRATION OF USER
IDENTIFICATION
INFORMATION TABLE

FIG. 20

PHONE NUMBER STORAGE TABLE

| IDENTIFICATION NUMBER | CALL DESTINATION | CALLER NAME |
|---|---|---|
| 1 | JOHN SMITH | JANE SMITH |
| 2 | BOB SMITH | MARY SMITH |
| 3 | BILL SMITH | BETH SMITH |
| .. | .. | .. |
| .. | .. | .. |

PHONE COMMUNICATION CONTROLLING METHOD

TECHNICAL FIELD

1. Field of the Invention

The invention relates to a communication system, a method for controlling a communication system.

2. Description of the Related Art

When a user makes a phone call, the user directly inputs a phone number of a person to be called to a sending terminal. Thus, the sending terminal performs a call operation. A sending terminal prestores a name associated with a phone number in a memory, a phonebook of the terminal. When a name of a person to whom the caller wishes to speak is input through a key operation, the terminal searches for a stored phone number associated with the name, and makes a call by using the phone number obtained through the search operation. A technique related to the above techniques is disclosed in Japanese Laid-open Patent Publication No. 9-233187.

In general, for example, when a call operation is performed, the phone numbers of a receiving terminal and a sending terminal are revealed by the users of the terminals. Accordingly, if the sending terminal sends its own phone number at a calling time, the receiving terminal can identify the sending terminal or the user of the sending terminal by using the sent phone number.

Additionally, in general, when a sending terminal makes an anonymous call without revealing the phone number thereof to a receiving terminal, the sending terminal uses a "caller ID blocking service" provided by a common carrier and makes a call.

However, in the related arts, the network identification information, a phone number of a sending terminal is not sent to a user of the receiving terminal. Accordingly, the user of the receiving terminal cannot disadvantageously identify the sending terminal.

For instance, in the above-described example, since a receiving terminal identifies a sending by terminal using the receiving phone number of the sending terminal, the sending terminal reveals the phone number thereof to the user of the receiving terminal. In addition, for example, in the technology using the caller ID blocking service, the user of the receiving terminal cannot identify the sending terminal. Note that Japanese Unexamined Patent Application Publication No. 9-233187 does not describe a technique for identifying a sending terminal.

SUMMARY

According to an aspect of the embodiment provides a communication terminal for communicating in a network. The terminal receives from another communication terminal a request comprising an obscured call information for obscuring an identification information. The communication terminal obscures the identification information after receiving the request.

BRIEF DESCRIPTION OF THE DRAWINGS

FIG. 4 is a diagram illustrating a phone number storage module according to the first embodiment;

FIG. 5 is a diagram illustrating a call information storage module according to the first embodiment;

FIG. 6 is a diagram illustrating a user identification information storage module according to the first embodiment;

FIG. 11 is a diagram illustrating user identification information according to a second embodiment;

FIG. 17 is a diagram illustrating the exemplary process for requesting modification of the user identification information according to the fifth embodiment;

FIG. 20 is a diagram illustrating a call information storage module according to a sixth embodiment;

DESCRIPTION OF THE PREFERRED EMBODIMENTS

First Embodiment

Description of Terms

The terms used in the description of the present embodiment are described first. The term "connection request" refers to information requesting connection of a sending terminal with a receiving terminal. The "connection request" is sent from the sending terminal and is received by the receiving terminal via a network. Examples of the connection request include a telephone call for calling a land phone, a telephone call for calling a mobile phone, a telephone call or a message call (e.g., an INVITE message) for calling a VoIP (Voice over Internet Protocol)-based telephone, such as an IP telephone, and a mail call for transmitting a mail.

The term "terminal" refers to a telecommunication apparatus that sends and receives information to and from another telecommunication apparatus via a telecommunication network. Examples of the terminal include a telephone set, a mobile phone, a personal handy-phone system (PHS), a personal digital assistant (PDA), and a personal computer (PC). The term "sending terminal" refers to a terminal that sends a connection request to the other terminal when a caller (user) of the sending terminal input network identification information (e.g., a phone number). The term "receiving terminal" refers to a terminal that receives a connection request from the sending terminal.

The term "network identification information" refers to information used for uniquely identifying a terminal in a network. More specifically, by using the network identification information, a terminal connected to the network can send a connection request to the other terminal. That is, network identification information is personal information. If the user of the receiving terminal identifies the network identification information of the sending terminal, the caller's anonymity cannot be guaranteed. Examples of the network identification information include a phone number, a VoIP address (e.g., SIP-URI (Session Initiation Protocol-URI)), and a mail address.

Since the network identification information is personal information that breaks the caller's anonymity if the callee knows the network identification information of the sending terminal, it is desirable that the network identification information is not notified to the callee, that is, is obscured from the callee. However, at the same time, the need for a callee to uniquely identify a caller is still present. According to the embodiment, the communication system meets such a need.

Communication System of First Embodiment

Figure 1:
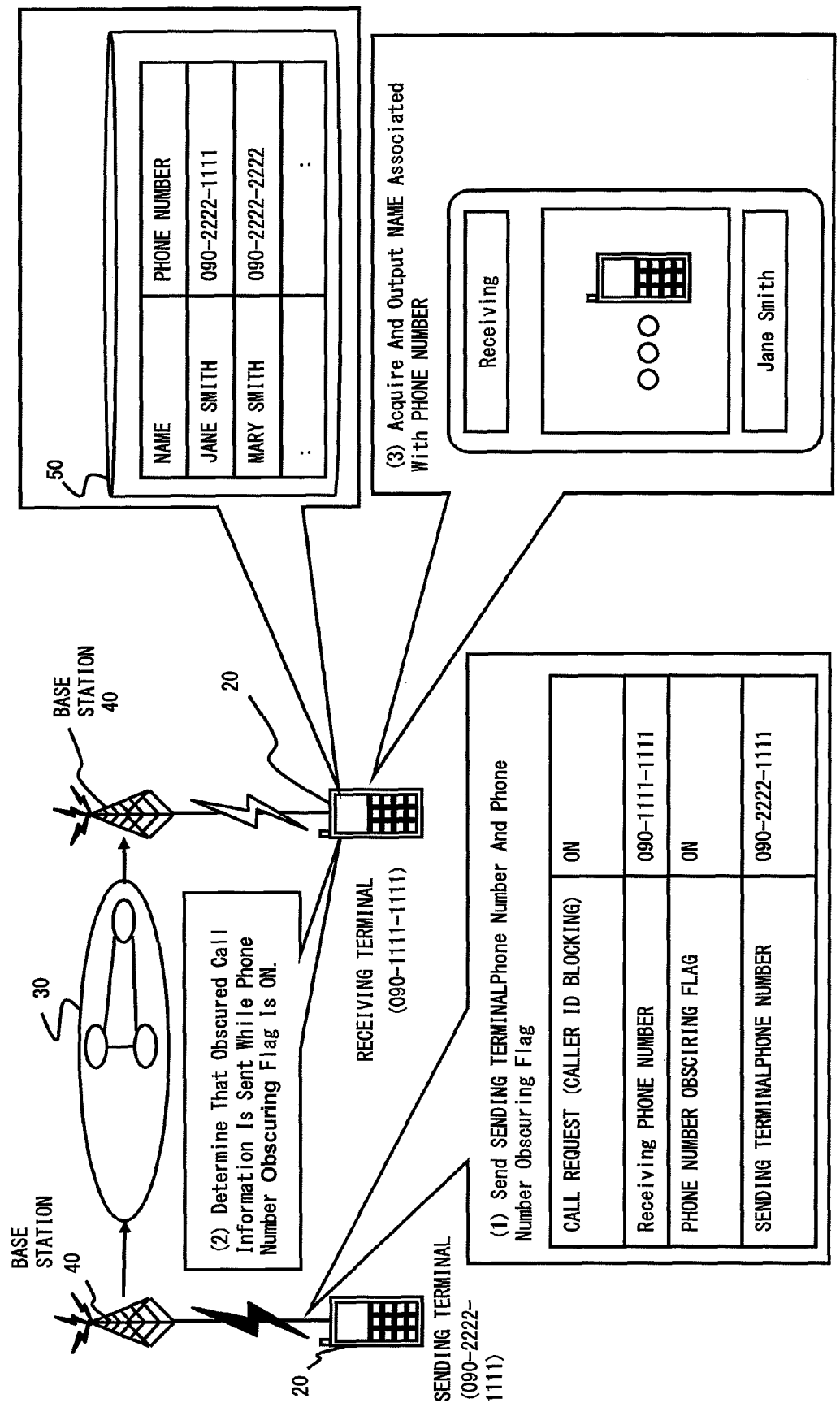
FIG. 1 illustrates the outline and features of a communication system according to a first embodiment.

A communication system of a first embodiment is described with reference to FIG. 1. FIG. 1 illustrates the communication system according to the first embodiment.

According to the first embodiment, as illustrated in FIG. 1, the communication system includes a sending terminal 10 and a receiving terminal 20, which are identified by using network identification information that uniquely identifies terminals in a network 30. For instance, in an example shown in FIG. 1, the communication system includes the sending terminal 10 identified by a phone number "090-2222-1111", and the receiving terminal 20 identified by a phone number "090-1111-1111".

In the communication system according to the first embodiment having such a configuration, when a caller who uses the sending terminal 10 inputs the network identification information indicating the receiving terminal 20 to the sending terminal 10, the sending terminal 10 sends a connection request for requesting connection with the receiving terminal 20. The receiving terminal 20 receives the connection request via the network 30. For instance, in the example shown in FIG. 1, when the phone number "090-1111-1111" is input to the sending terminal 10, the sending terminal 10 sends a connection request requesting a connection with the receiving terminal 20 to a base station 40 via the network 30. The receiving terminal 20 receives the connection request sent from the sending terminal 10 from the base station 40 via the network 30.

In the communication system described above, the user of the receiving terminal can identify the sending terminal that sent the connection request even when the network identification information such as a phone number of the sending terminal is not disclosed to the user of the receiving terminal.

According to the first embodiment, the receiving terminal 20 stores the network identification information of the sending terminal in association with user identification information in a storage module 50. For instance, in the example shown in FIG. 1, the receiving terminal 20 associates user identification information "name: Jane Smith" with caller network identification information "phone number: 090-2222-1111" and stores the information in the storage module 50. In addition, the receiving terminal 20 associates user identification information "name: Mary Smith" with caller network identification information "phone number: 090-2222-2222" and stores this information in the storage module 50. Information stored in the storage module 50 of the receiving terminal 20 is received together with a connection request sent from the sending terminal 10. For example, the receiving terminal 20 associates the name sent from the sending terminal 10 with the phone number sent from the sending terminal 10, and stores this information in the storage module 50.

The term "user identification information" refers to information that is different from the network identification information, and that enables a user of a receiving terminal to uniquely identify a user of a sending terminal. A terminal in a network cannot be uniquely identified by only user identification information. Accordingly, the terminal connected to the network cannot send a connection request to another terminal by only using user identification information. Therefore, even when the user identification information is revealed to the user of the receiving terminal, the caller's anonymity is not adversely affected. For example, a name, a false name, a nickname, or the name of the district of residence input by the user of a sending terminal can be used for user identification information.

In the communication system according to the first embodiment, the sending terminal 10 sends caller network identification information indicating the sending terminal and obscured call information to the receiving terminal 20 together with a connection request.

For example, according to the first embodiment, in a process (1) of the communication system shown in FIG. 1, the sending terminal 10 sends a normal connection request including information "call request (caller ID blocking): ON" and "callee phone number: 090-1111-1111". In the process (1) shown in FIG. 1, the sending terminal 10 sends caller network identification information "sending terminal phone number: 090-2222-1111" and obscured call information "phone number obscuring flag: ON" together with the normal connection request.

Subsequently, in the communication system according to the first embodiment, upon receiving the connection request from the sending terminal 10, the receiving terminal 20 determines whether the obscured call information is sent together with the connection request. The obscured call information indicates an obscured call in which the user identification information is revealed while the caller network identification information kept obscured. For example, in a process (2) shown in FIG. 1, the receiving terminal 20 determines whether a normal request has been sent while the phone number obscuring flag is ON.

Thereafter, in the communication system according to the first embodiment, if the receiving terminal 20 determines that the obscured call information is sent from the sending terminal, the receiving terminal 20 searches for the user identification information stored in the storage module 50 in association with the caller network identification information received from the sending terminal 10 as a search key. The receiving terminal 20 then outputs only the acquired user identification information from an output module. For example, in a process (3) shown in FIG. 1, upon determining that an obscured call is sent, the receiving terminal 20 acquires the user information "Jane Smith" associated with the network identification information "090-2222-1111" from the storage module 50 and outputs to, for example, a display of the receiving terminal 20.

In this way, in the communication system according to the first embodiment, as described above, the user of a receiving terminal can identify the sending terminal that sent a call thereto even when the network identification information (e.g., the phone number) is not disclosed to the user of the receiving terminal.

Note that the obscured call is different from the caller ID blocking call that is a connection request in which the caller network identification information indicating the sending terminal 10 is removed by the network 30 or the base station 40 so that the caller network identification information is not disclosed to the receiving terminal 20. In addition, the obscured call is different from the caller ID blocking call that is a connection request in which a receiving terminal cannot identify the sending terminal. That is, the obscured call is different from the caller ID blocking call, since the obscured call is a connection call in which the network identification information indicating the sending terminal 10 is not removed from the connection request by the network 30 or the base station 40 so as to be notified to the receiving terminal 20. Thus, the obscured call allows the receiving terminal 20 to identify the sending terminal 10.

Configuration of Communication System

A configuration of the communication system according to the first embodiment is described with reference to FIGS. 2 to 6. As shown in FIG. 1, in the communication system according to the first embodiment, the sending terminal 10 is connected to the receiving terminal 20 via the network 30. Hereinafter, a configuration of a sending terminal is described first. Components of the configuration of the communication system closely relating to the present embodiment are primarily described. Descriptions of the other components similar to those of existing communication systems are not repeated or are briefly stated.

Configuration of Sending Terminal of Communication System

Figure 2:
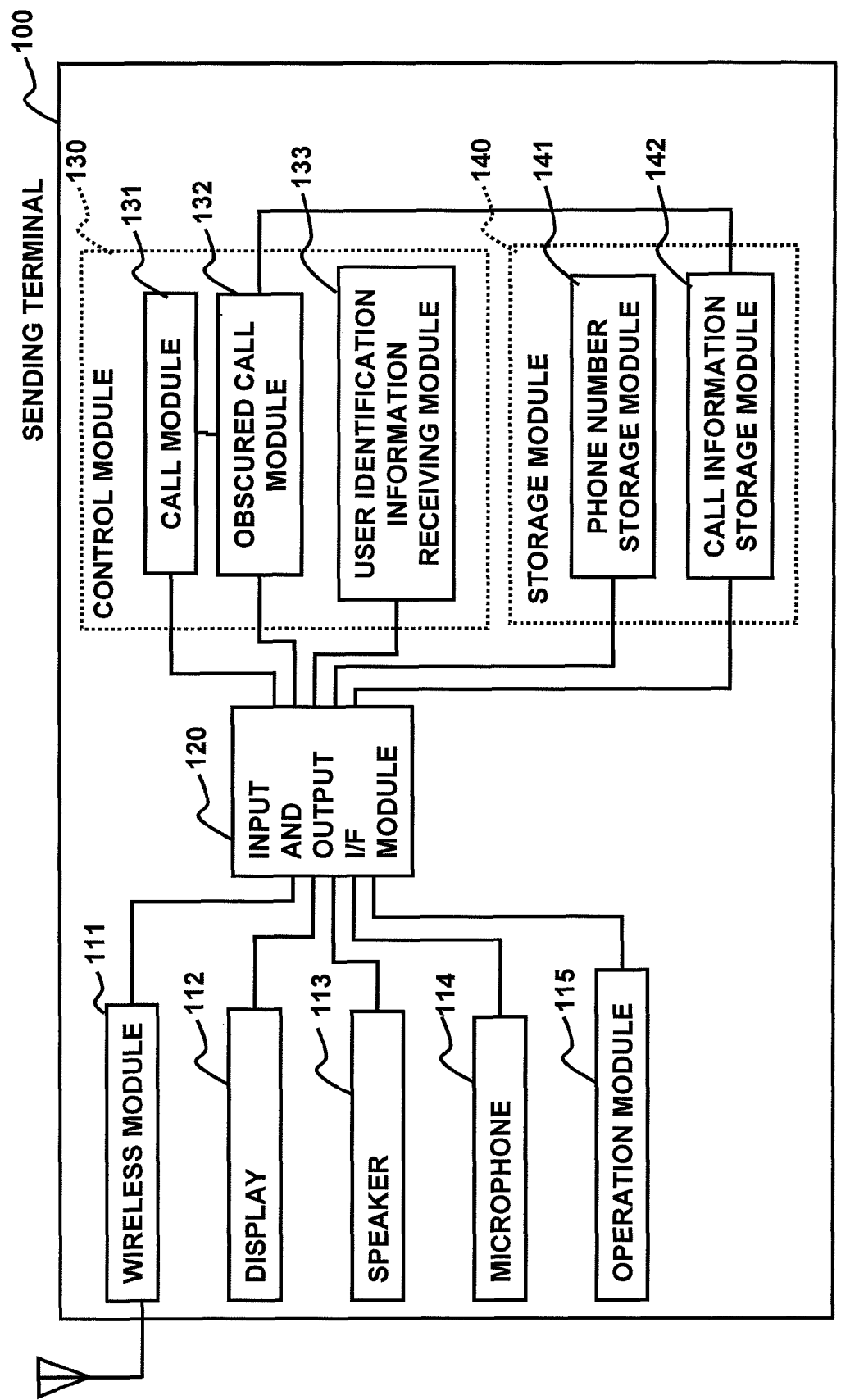
FIG. 2 is a block diagram of an exemplary configuration of a sending terminal of the communication system according to the first embodiment.

An exemplary structure of a sending terminal of the communication system according to the first embodiment is described below with reference to FIG. 2. In FIG.2, the sending terminal has a phone number "090-2222-1111". FIG. 2 is a block diagram of the configuration of a sending terminal of the communication system according to the first embodiment. As shown in FIG. 2, a sending terminal 100 includes a wireless module 111, a display 112, a speaker 113, a microphone 114, an operation module 115, an input and output I/F module 120, a control module 130, and a storage module 140.

The wireless module 111 transmits radio waves to a receiving terminal 200 via a network. In addition, the wireless module 111 converts communication data to be sent from a sending terminal 100 via the network to radio waves.

The display module 112 is a display that displays characters and figures thereon. The display module 112 may include a liquid crystal display or an organic electroluminescence (EL) display. The speaker 113 outputs sound. For example, when the receiving terminal 200 receives a telephone call or an e-mail, the speaker 113 outputs ring tones. The microphone 114 collects ambient sound. For example, when sound communication is performed, the microphone 114 collects the voice of a user of the sending terminal 100.

The operation module 115 recognizes the operation performed by the user of the sending terminal 100, and sends the details of the operation to a controller 130 of the sending terminal 100. More specifically, the operation module 115 recognizes an input operation of the callee network identification information performed by the user of the sending terminal, and sends the information to a call module 131 and an obscured call module 132, which are described below. For example, the operation module 115 includes a ten key, operation keys, a rotational selector, a cursor, a four-way key, a setting key, an activation key, a response key, and a call-ending key or a power key.

The input and output I/F module 120 controls communication of various information among the wireless module 111, the display 112, the speaker 113, the microphone 114, the operation module 115, the control module 130, and the storage module 140.

The storage module 140 stores data and programs required for various call processing. As shown in FIG. 2, the storage module 140 includes a phone number storage module 141 and a call information storage module 142.

The phone number storage module 141 prestores callee network identification information required for various call processing performed by the sending terminal 100. More specifically, as illustrated in FIG. 4, the phone number storage module 141 prestores a "name" that uniquely identifies the user of the receiving terminal 200 and that is associated with a "phone number" serving as the callee network identification information in a "phone number storage table" together with an identification number that uniquely identifies the correspondence between the "name" and the "phone number".

The sending terminal 100 stores a correspondence between a name and a phone number input by the user of the sending terminal in advance. In this way, such information is preset in the phone number storage module 141.

For instance, in the example shown in FIG. 4, the phone number storage module 141 stores a correspondence between "name: John Smith" and "phone number: 090-1111-1111" in the phone number storage table together with "identification number: 1". In addition, the phone number storage module 141 stores a correspondence between "name: Bob Smith" and "phone number: 090-1111-2222" in the phone number storage table together with "identification number: 2". Furthermore, the phone number storage module 141 stores a correspondence between "name: Bill Smith" and "phone number: 090-1111-3333" in the phone number storage table together with "identification number: 3".

The call information storage module 142 prestores the user identification information indicating the sending terminal 100. If a user identification information receiving module 133 cannot receive the user identification information, the call information storage module 142 stores user identification information of the caller output from the obscured call module 132 described below. For example, as illustrated in FIG. 5, the call information storage module 142 stores a caller name by which the user of the receiving terminal can uniquely identifies the sending terminal 100. In the example shown in FIG. 5, the caller name "Jane Smith" is stored in the call information storage module 142.

The sending terminal 100 stores a caller name input by the user of the sending terminal in advance. In this way, such information is preset in the call information storage module 142.

The control module 130 includes an internal memory for storing control programs, such as an operating system (OS) and programs defining a variety of the call processing procedures, and required data. The control module 130 performs a variety of processing using the control programs and the data so as to control the sending terminal 100. As shown in FIG. 2, the control module 130 includes the call module 131, the obscured call module 132, and the user identification information receiving module 133. The obscured call module 132 corresponds to "obscuring information transmission module" described in the appended claims.

When callee network identification information is input by the user of the sending terminal 100 via the operation module 115, the call module 131 sends a connection request to the receiving terminal 200, or to the network, for establishing a connection with the receiving terminal 200. For example, upon receiving the phone number "090-1111-1111" from the operation module 115, the call module 131 sends a connection request to a receiving terminal uniquely identified by the phone number "090-1111-1111" using the wireless module 111. Alternatively, for example, upon receipt of an operation for selecting the name "John Smith" is performed by the user of the sending terminal, the call module 131 acquires, from the phone number storage module 141, the phone number "090-1111-1111" which is stored in association with the name "John Smith". Subsequently, the call module 131 sends a connection request to a receiving terminal uniquely identified by the phone number "090-1111-1111" through the wireless module 111.

Furthermore, during transmission of the connection request, if the call module 131 receives an instruction indicating that the connection request has a caller ID blocking call mode from the user of the sending terminal through the operation module 115, the call module 131 sends the connection request in a caller ID blocking call mode. However, if the call module 131 receives no instruction indicating that the connection request has a caller ID blocking call mode from the operation module 115, the call module 131 sends the connection request with a normal call mode in which the caller network identification information is notified to the receiving terminal 200. For example, when only the phone number "090-1111-1111" is input from the operation module 115, the call module 131 sends a connection request in a normal call mode to the receiving terminal 200 uniquely identified by the phone number "090-1111-1111". In addition, when the phone number "090-1111-1111" together with a number "184" is input from the operation module 115, the call module 131 sends a connection request with a caller ID blocking call mode to the receiving terminal 200 uniquely identified by the phone number "090-1111-1111". The number "184" is an identification number to request to the base station 40 not to send the caller ID to the receiving terminal 200.

The user identification information receiving module 133 receives the user identification information indicating the sending terminal 100. When the obscured call module 132 sends obscured call information, the user identification information receiving module 133 receives the user identification information input by the user of the sending terminal through the operation module 115. The user identification information receiving module 133 then notifies the obscured call module 132 of the user identification information.

During transmission of the connection request, when the obscured call module 132 receives an instruction indicating that the connection request is in an obscured call mode from the operation module 115, the obscured call module 132 sends the connection request in an obscured call mode. More specifically, when sending a connection request to the receiving terminal 200, the obscured call module 132 sends the caller network identification information indicating the network identification information of the sending terminal 100 and the obscured call information to the receiving terminal 200. The caller network identification information may include the phone number of the sending terminal. The obscured call module 132 sends the caller phone number for uniquely identifying the sending terminal 100 as the caller network identification information.

In the first embodiment, the obscured call module 132 performs a call in a caller ID blocking call mode and performs a call in an obscured call mode by sending the network identification information together with the obscured call information to the receiving terminal. However, the embodiment is not limited thereto. For example, the obscured call module 132 may perform only a call with an obscured call mode without performing a call with a caller ID blocking call mode.

In addition, in the first embodiment, the obscured call module 132 makes a call in an obscured call mode when the obscured call module 132 received an instruction indicating an obscured call from the operation module 115. However, the invention is not limited thereto. For example, the obscured call module 132 may perform an obscured call even when the obscured call module 132 receives no instruction indicating an obscured call. For example, when the obscured call module 132 makes a call to a particular phone number, the obscured call module 132 may perform call processing in an obscured call mode.

For example, when the phone number "090-1111-1111" is input from the operation module 115 together with an instruction indicating an obscured call, the obscured call module 132 makes a call in a caller ID blocking call mode to the receiving terminal 200 uniquely identified by the phone number "090-1111-1111". At that time, the obscured call module 132 sends the phone number "090-2222-1111" indicating the sending terminal 100 and obscured call information together with the connection request in a caller ID blocking call mode so as to send a connection request for an obscured call. The obscured call information indicates an obscured call in which the name "Mary (Jane) Smith" is disclosed while the phone number "090-2222-1111" is obscured. Examples of the obscured call information include a phone number obscuring flag.

In addition, the obscured call module 132 sends the user identification information of the user of the sending terminal to the receiving terminal together with the caller network identification information. When the user identification information receiving module 133 receives the user identification information, the obscured call module 132 sends the received user identification information together with the caller network identification information. However, when the user identification information receiving module 133 receives no user identification information, the obscured call module 132 sends the user identification information stored in the call information storage module 142 together with the caller network identification information.

For example, the obscured call module 132 makes a call in a caller ID blocking call mode when the phone number "090-1111-1111" and an instruction indicating an obscured call are input from the operation module 115 and, subsequently, the user identification information receiving module 133 receives the name "Mary Smith" and disclosed the obscured call module 132 of the name. At that time, the obscured call module 132 sends the phone number "090-2222-1111", obscured call information such as a phone number obscuring flag and the name "Mary Smith", and makes the call in a caller ID blocking call mode. In this way, the obscured call module 132 sends a connection request for an obscured call.

In addition, for example, the obscured call module 132 makes a call in a caller ID blocking call mode when the phone number "090-1111-1111" and an instruction indicating an obscured call are input from the operation module 115 and, the user identification information receiving module 133 cannot receive the name. At that time, the obscured call module 132 sends the phone number "090-2222-1111", obscured call information and a name "Jane Smith" stored in the call information storage module 142 together, and makes the call in a caller ID blocking call mode. In this way, the obscured call module 132 sends a connection request for an obscured call.

Configuration of Receiving Terminal of Communication System

Figure 3:
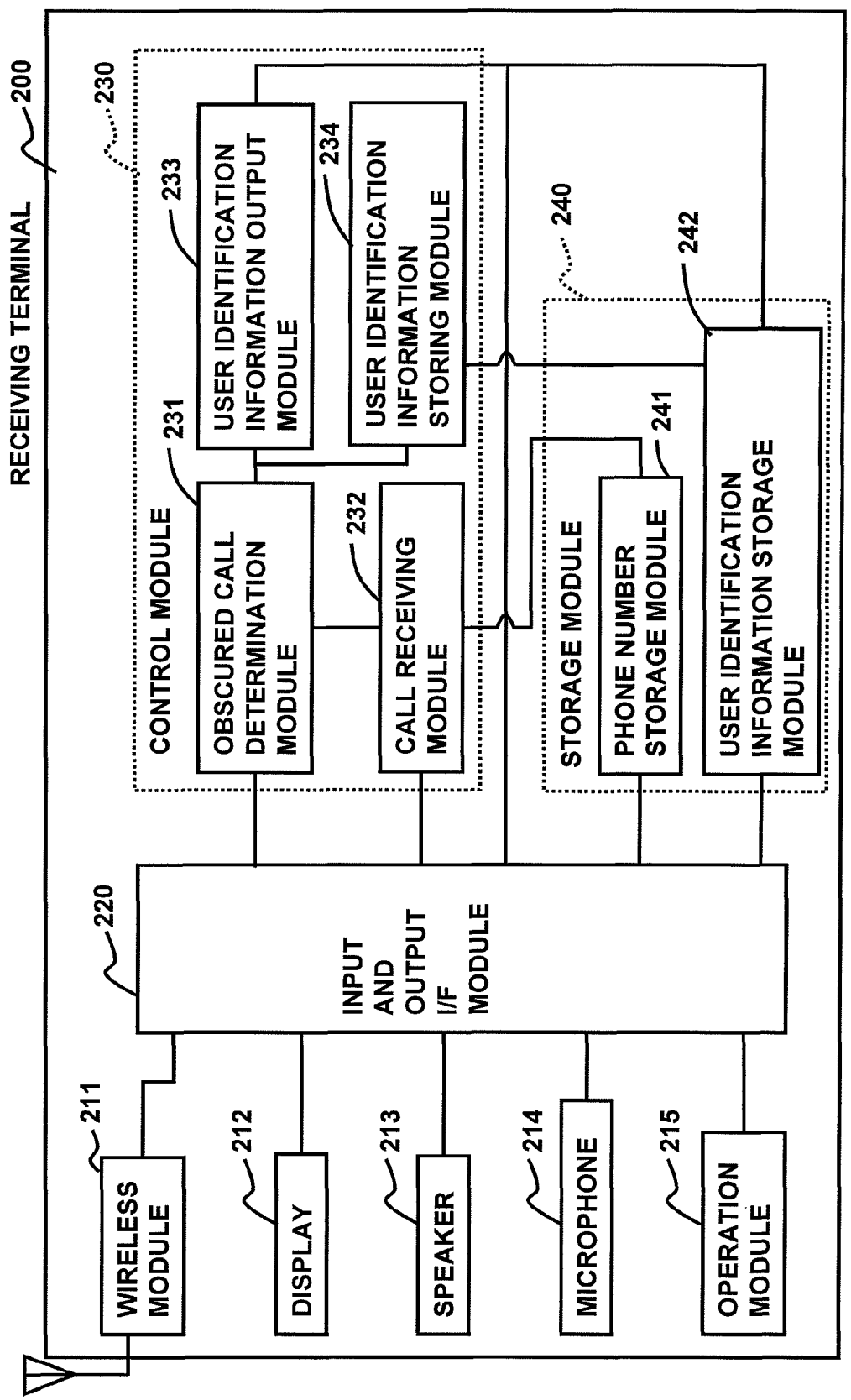
FIG. 3 is a block diagram of an exemplary configuration of a receiving terminal of the communication system according to the first embodiment.

An exemplary structure of a receiving terminal of the communication system according to the first embodiment is described below with reference to FIG. 3. In FIG.3, the receiving terminal has a phone number "090-1111-1111". As shown in FIG. 3, a receiving terminal 200 includes a wireless module 211, a display module 212, a speaker 213, a microphone 214, an operation module 215, an input and output I/F module 220, a control module 230, and a storage module 240. Descriptions of the structures similar to those of the sending terminal 100 are not repeated or are briefly stated.

The wireless module 211 receives radio waves from the sending terminal 100 via a network. In addition, the wireless module 211 converts the radio waves received by the receiving terminal 200 via the network into communication data. Since the speaker 213 and the microphone 214 are similar to the speaker 113 and the microphone 114 of the sending terminal 100, respectively, descriptions are not repeated.

Like the display 112, the display module 212 is a display that displays characters and figures thereon. The display module 212 may include a liquid crystal display or an organic electroluminescence (EL) display. Upon receiving an instruction for outputting only a caller name from a user identification information output module 233, the display module 212 displays the caller name.

The operation module 215 recognizes the operation performed by the user of the receiving terminal and sends the details of the operation to the controller of the receiving terminal 200. The input and output I/F module 220 controls communication of various information among the wireless module 211, the display module 212, the speaker 213, the microphone 214, the operation module 215, the control module 230, and the storage module 240.

The storage module 240 stores data and programs required for various processing of an incoming call. As shown in FIG. 3, the storage module 240 includes a phone number storage module 241 and a user identification information storage module 242.

Since the phone number storage module 241 is similar to the phone number storage module 141 of the sending terminal 100, the description is not repeated.

The user identification information storage module 242 associates the caller network identification information with the user identification information, and stores the information. If the user identification information storage module 242 stores the caller phone number as caller network identification information, and stores the caller name as user identification information. As illustrated in FIG. 6, the user identification information storage module 242 stores a correspondence between a "caller name" and a "phone number" together with an identification number. For instance, in the example shown in FIG. 6, the correspondence between the caller name "Jane Smith" and the phone number "090-2222-1111" is stored with an identification number of "1". In addition, the correspondence between the caller name "Mary Smith" and the phone number "090-2222-2222" is stored with an identification number of "2".

Such information is stored in the user identification information storage module 242 by a user identification information storing module 234 after the user identification information storing module 234 associates the name sent by the sending terminal 100 with the phone number of the sending terminal received together with the connection request. Alternatively, such information is input through the operation of the receiving terminal. Note that, in the communication system, the information stored in the user identification information storage module 242 is invisible to, or inaccessible by the user of the receiving terminal.

In the user identification information storage module 242, the identification number is added and stored for convenience. Therefore, for example, only the correspondence between the caller name and the phone number may be stored in the user identification information storage module 242.

The control module 230 includes an internal memory for storing control programs, such as an operating system and programs defining a variety of incoming call processing procedures, and required data. The control module 230 performs a variety of processing using the control programs and the data so as to control the receiving terminal 200. As shown in FIG. 3, the control module 230 includes a call receiving module 231, an obscured call determination module 232, the user identification information output module 233, and the user identification information storing module 234.

The call receiving module 231 performs processing related to reception of a connection request sent from the sending terminal 100. For example, upon receiving a connection request from the sending terminal 100 identified by the phone number "090-2222-1111", the call receiving module 231 determines whether a connection request is received in a normal call mode. If it is determined that a connection request is received in a normal call mode, the phone number "090-2222-1111" is displayed on the display module 212. However, if it is determined that a connection request is received in a non-normal call mode, it is further determined whether a connection request is received in a caller ID blocking call mode. If it is determined that a connection request is received in a caller ID blocking call mode, and the obscured call determination module 232 determines that obscured call information is not sent, only a message "No information" is displayed on the display module 212.

Upon receiving a connection request from the sending terminal 100, the obscured call determination module 232 determines whether obscured call information is sent together with the connection request. If, for example, a phone number obscuring flag is received together with a connection request from the sending terminal 100, the obscured call determination module 232 determines that obscured call information is sent together with the connection request. In addition, if the obscured call information is received together with the connection request, the obscured call determination module 232 determines whether the call in an obscured call mode was performed. However, if the obscured call information is not received together with the connection request, the obscured call determination module 232 instructs the call receiving module 231 to make a determination again.

If the user identification information storing module 234 receives the caller network identification information and the user identification information from the sending terminal 100, the user identification information storing module 234 associates the received caller network identification information with the received user identification information, and stores the information in the user identification information storage module 242. For example, when the user identification information storing module 234 receives the phone number "090-2222-1111" and obscured call information from the sending terminal 100, the user identification information storing module 234 determines whether the caller name is received. If the caller name "Jane Smith" is received, the user identification information storing module 234 stores a correspondence between the phone number "090-2222-1111" and the name "Jane Smith" in the user identification information storage module 242.

If the obscured call determination module 232 determines that obscured call information is sent, the user identification information output module 233 searches for the user identification information associated with the caller network identification information received from the obscured call module 132 by using the caller network identification information as a search key so as to acquire the user identification information. Thereafter, the user identification information output module 233 displays only the acquired user identification information on the display module 212. More specifically, using the caller phone number as a search key, the user identification information output module 233 searches the user identification information storage module 242 for the name associated with the caller phone number, and displays the acquired name on the display module 212. Alternatively, the user identification information output module 233 displays the user identification information stored by the user identification information storing module 234 on the display module 212.

If the receiving terminal 200 receives the phone number "090-2222-1111" and obscured call information together with a connection request from the sending terminal, and the obscured call determination module 232 determines that an obscured call was performed, the user identification information output module 233 searches for the caller name stored in the user identification information storage module 242 in association with the phone number "090-2222-1111" using the phone number "090-2222-1111" as a search key (refer to FIG. 6). If the name "Jane Smith" associated with the phone number "090-2222-1111" is found, the user identification information output module 233 acquires the found name "Jane Smith" and displays only the name "Jane Smith" on the display module 212.

In contrast, if a name associated with the phone number "090-2222-1111" is not found, the user identification information output module 233 does not display the received phone number "090-2222-1111" and displays only a message "No information" on the display module 212.

It should be noted that the communication system can be achieved by installing the functions of the above-described obscured call module 132, obscured call determination module 232, and user identification information output module 233 in an existing information processing apparatus, such as a personal computer, a workstation, a cell phone, a PHS terminal, a mobile communication terminal, or a PDA.

Process of Connection Request Call Performed by Sending Terminal

Figure 7:
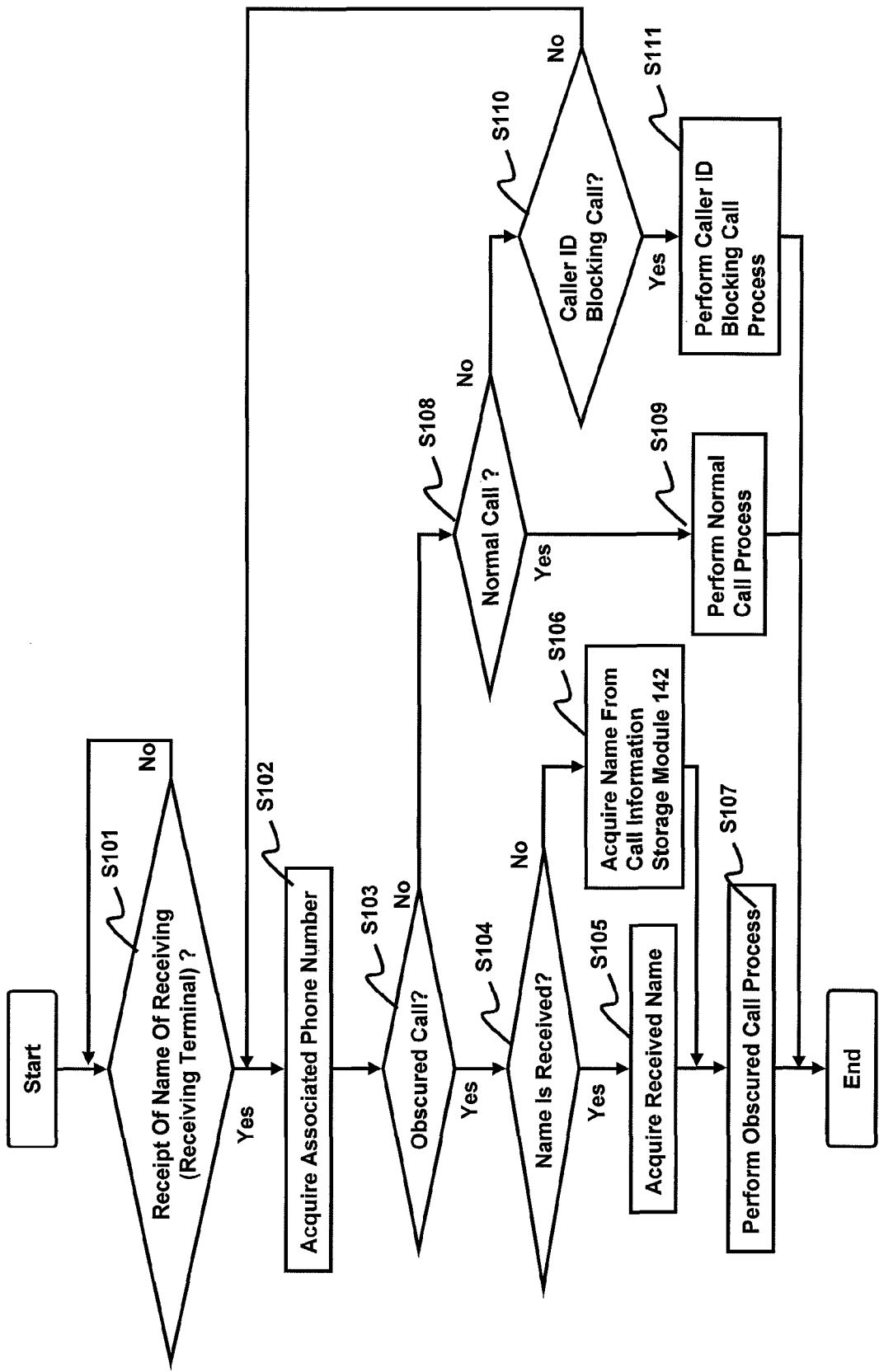
FIG. 7 is a flow chart illustrating an exemplary process of a connection request call performed by the sending terminal according to the first embodiment.
Figure 8:
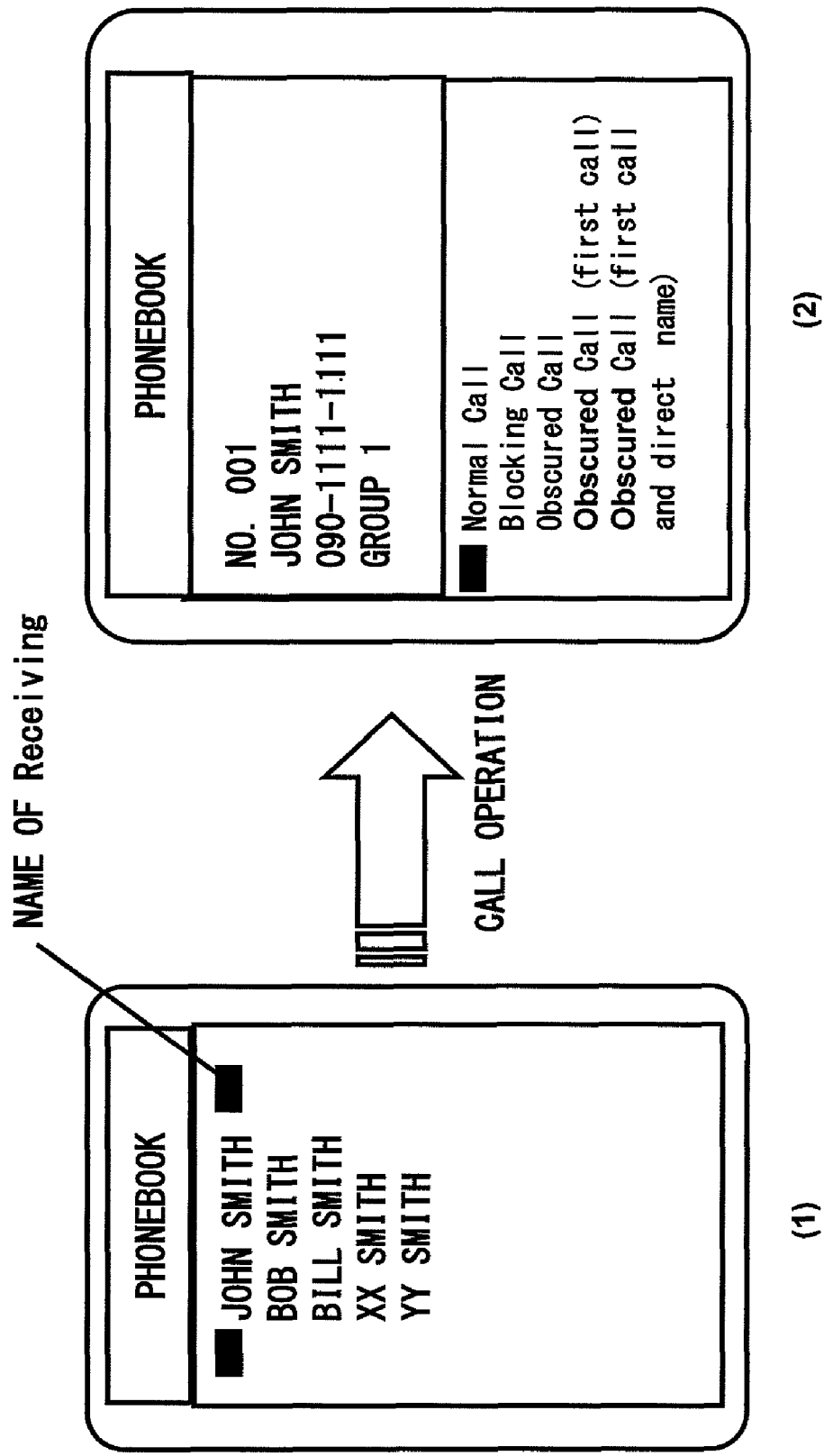
FIG. 8 is a diagram illustrating the exemplary process of a connection request call performed by the sending terminal according to the first embodiment.

An exemplary process of a connection request call performed by the sending terminal according to the first embodiment is described next with reference to FIGS. 7 and 8. FIG. 7 is a flow chart illustrating the exemplary process of a connection request call performed by the sending terminal according to the first embodiment. FIG. 8 is a diagram illustrating the exemplary process of a connection request call performed by the sending terminal according to the first embodiment. In the first embodiment, it is assumed that the phone number storage module 141 of the sending terminal 100 stores the name and the phone number.

As shown in FIG. 7, upon receiving the name of the receiving terminal ("YES" at step S101), as shown in a screen (1) of FIG. 8, the call module 131 acquires the associated phone number when the operation for selecting the name "John Smith" is performed by the user of the sending terminal (step S102). That is, the call module 131 acquires the phone number "090-1111-1111" associated with the name "John Smith" from the phone number storage module 141 (refer to FIG. 4).

Subsequently, the obscured call module 132 determines whether it has received an instruction indicating an obscured call (step S103). If the obscured call module 132 determines that it has received an instruction indicating an obscured call ("YES" at step S103), for instance, if an item "Obscured call" is selected as shown in a screen (2) of FIG. 8, the obscured call module 132 determines whether the name indicating the caller is received (step S104). That is, the obscured call module 132 determines whether the name is received by the user identification information receiving module 133, and the name is notified to the obscured call module 132. If the name is received ("YES" at step S104), the obscured call module 132 acquires the received name (step S105). However, if the name is not received ("NO" at step S104), the obscured call module 132 acquires the name from the call information storage module 142 (step S106). For example, the caller name "Jane Smith" is acquired (refer to FIG. 5). Thereafter, the obscured call module 132 performs an obscured call (step S107). That is, for example, the obscured call module 132 sends the phone number "090-2222-1111", obscured call information, and the acquired caller name (e.g., "Jane Smith") to the receiving terminal 200 uniquely identified by the phone number "090-1111-1111", and sends a connection request in an obscured call mode. Thereafter, the call process is completed.

In contrast, if the obscured call module 132 determines that it does not receive an instruction indicating an obscured call ("NO" at step S103), the call module 131 determines whether the call is a normal call (step S108). If the obscured call module 132 determines that the call is a normal call ("YES" at step S108), for example, if an item "Normal Call" is selected as shown in FIG. 8(2), a normal call process is performed (step S109). That is, for example, a connection request is sent in a normal call mode to the receiving terminal 200 uniquely identified by the phone number "090-1111-1111". Thereafter, the call process is completed.

If the call module 131 determines that the call is not a normal call ("NO" at step S108), the call module 131 determines whether it receives an instruction indicating a caller ID blocking call (step S110). If the call module 131 determines that it receives an instruction indicating a caller ID blocking call ("YES" at step S110), for example, if an item "184 Call" (a caller ID blocking call) is selected as shown in FIG. 8(2), a caller ID blocking call is performed (step S111). That is, for example, a connection request is sent in a caller ID blocking call mode to the receiving terminal 200 uniquely identified by the phone number "090-1111-1111". Thereafter, the call process is completed.

If it is determined at step S110 that the call is not a call in a caller ID blocking call mode ("NO" at step S110), the determination processes at steps S103, S108, and S110 are repeated until the determination in any one of these steps becomes "YES", and the mode of the connection request is determined. The subsequent processes (steps S104 to S107, step S109, or step S111) are then performed. Thereafter, the call process is completed.

Process of Reception of Connection Request Performed by Receiving Terminal

Figure 9:
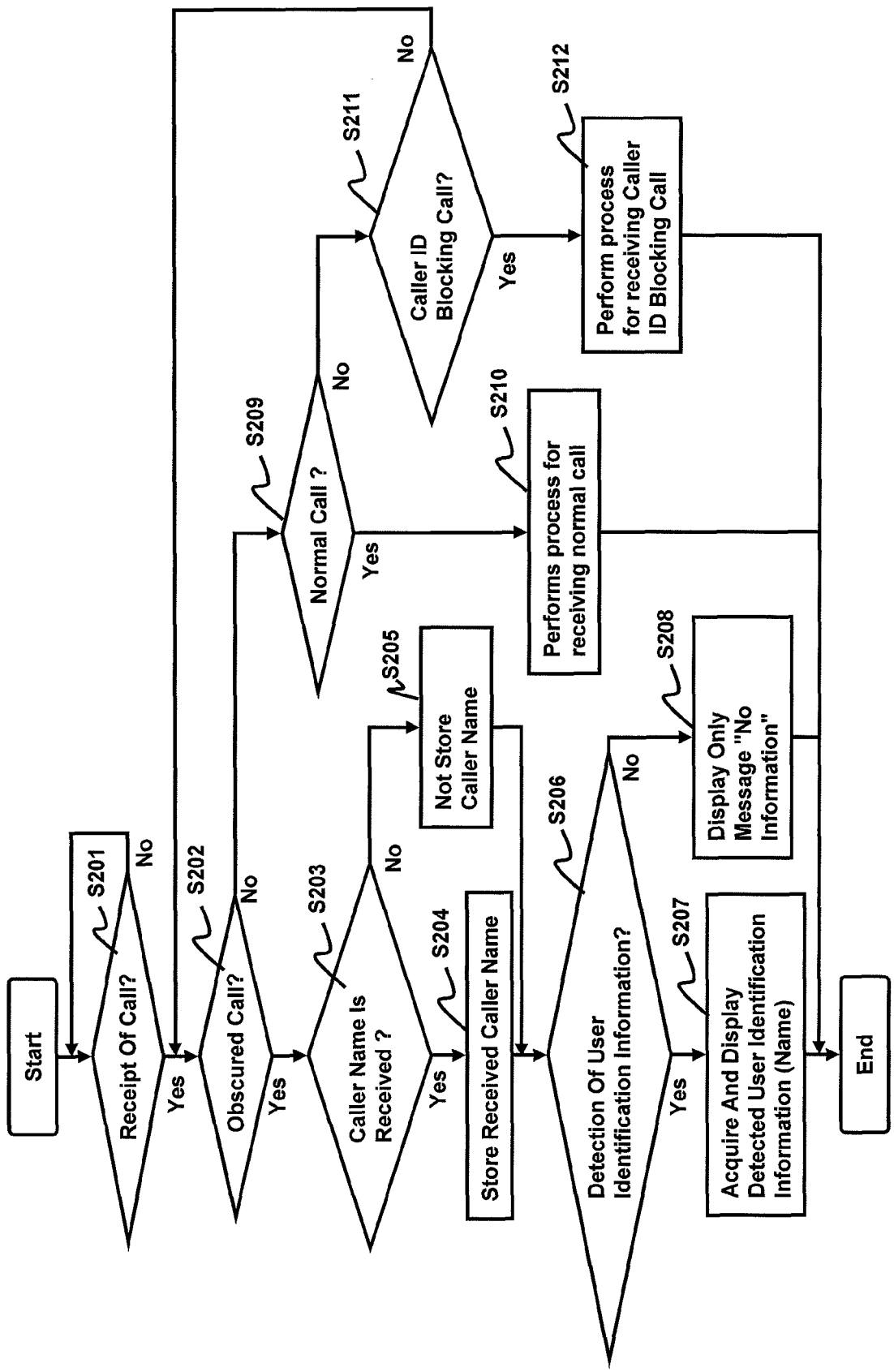
FIG. 9 is a flow chart illustrating an exemplary process of receiving a connection request performed by the receiving terminal according to the first embodiment.
Figure 10:
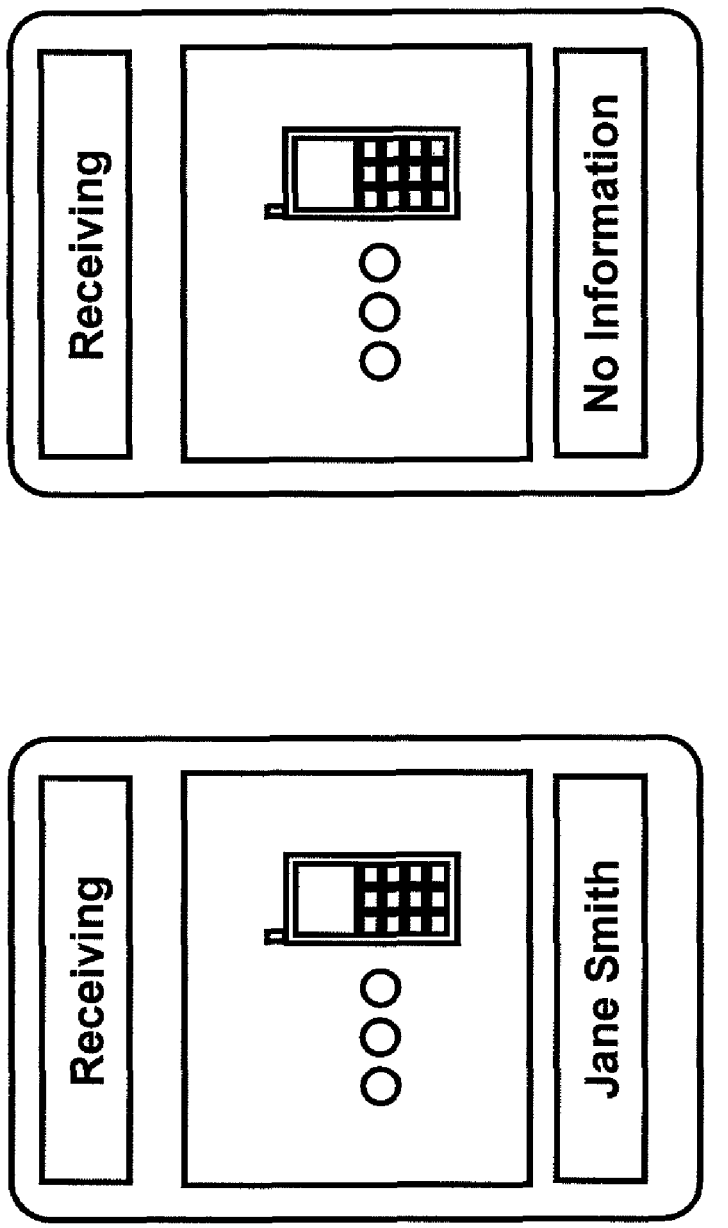
FIG. 10 is a diagram illustrating the exemplary process of receiving a connection request performed by the receiving terminal according to the first embodiment.

An exemplary process of receiving a connection request performed by the receiving terminal according to the first embodiment is described next with reference to FIGS. 9 and 10. FIG. 9 is a flow chart illustrating the exemplary process of reception of a connection request performed by the receiving terminal according to the first embodiment. FIG. 10 is a diagram illustrating the exemplary process of reception of a connection request performed by the receiving terminal according to the first embodiment.

As shown in FIG. 9, upon receiving a call ("YES" at step S201), that is, upon receiving a connection request, the obscured call determination module 232 determines whether the call is an obscured call (step S202). That is, the obscured call determination module 232 determines whether the obscured call information is sent together with the connection request. If the obscured call determination module 232 determines that the call is an obscured call ("YES" at step S202), that is, for example, if the obscured call determination module 232 determines that the phone number obscuring flag is received together with the connection request, the user identification information storing module 234 further determines whether the caller name is received together with the connection request (step S203). If the user identification information storing module 234 determines that the caller name is received together with the connection request ("YES" at step S203), the user identification information storing module 234 stores the received caller name (step S204). That is, for example, when the user identification information storing module 234 receives the phone number "090-2222-1111", the obscured call information, and the caller name "Jane Smith" from the sending terminal 100, the user identification information storing module 234 stores the correspondence between the phone number "090-2222-1111" and the name "Jane Smith" in the user identification information storage module 242. However, when the user identification information storing module 234 determines that the caller name is not received together with the connection request ("NO" at step S203), the user identification information storing module 234 does not store a caller name (step S205).

Subsequently, the user identification information output module 233 searches for the user identification information (step S206). That is, when the receiving terminal 200 receives the phone number "090-2222-1111" and the obscured call information together with the connection request, the user identification information output module 233 searches the user identification information storage module 242 for the caller name associated with the phone number "090-2222-1111" by using the phone number "090-2222-1111" as a search key (refer to FIG. 6). If the user identification information output module 233 detects the user identification information, that is a caller name ("YES" at step S206), the user identification information output module 233 acquires the detected user identification information and displays the acquired caller name (step S207). For instance, in a screen (1) of FIG. 10, if the user identification information output module 233 detects the caller name "Jane Smith" associated with the phone number "090-2222-1111", the user identification information output module 233 acquires the detected name "Jane Smith", and displays only the name "Jane Smith" on the display module 212. However, if the user identification information output module 233 cannot detect the user identification information ("NO" at step S206), the user identification information output module 233 displays only a message "No information" (step S208). For instance, in an example shown in a screen (2) of FIG. 10, the user identification information output module 233 does not display the received phone number "090-2222-1111" on the display module 212 and displays only a message "No information" on the display module 212. Thereafter, the call reception process is completed.

In contrast, if, at step S202, the obscured call determination module 232 determines that the call is not an obscured call ("NO" at step S202), the call receiving module 231 determines whether the call is a normal call (step S209). That is, the call receiving module 231 determines whether the connection request is received in a normal call mode. If the obscured call determination module 232 determines that the call is a normal call ("YES" at step S209), the obscured call determination module 232 performs a process for receiving a normal call (step S210). For example, when the obscured call determination module 232 receives a connection request from the sending terminal 100 identified by the phone number "090-2222-1111" and determines that the connection request is received in a normal call mode, the call receiving module 231 displays the phone number "090-2222-1111" on the display module 212. Thereafter, the call reception process is completed.

In addition, if the call receiving module 231 determines that the call is not a normal call ("NO" at step S209), the call receiving module 231 determines whether the call is a call ID blocking call (step S211). That is, the call receiving module 231 determines whether it has received a call request in a call ID blocking call mode. If the call receiving module 231 determines that it has received the call request in a call ID blocking call mode ("YES" at step S211), the call receiving module 231 performs processing for receiving a call in a call ID blocking call mode (step S212). That is, for example, the call receiving module 231 displays only a message "No information" on the display module 212. Thereafter, the call reception process is completed.

However, if it is determined at step S211 that the call is not a call ID blocking call ("NO" at step S211), the processes at steps S202, S209, and S211 are repeated until the determination in any one of these steps becomes "YES" and the mode of the connection request is determined. The subsequent process or processes (steps S203 to S208, step S210, or step S212) are then performed. Thereafter, the call reception process is completed.

As noted above, according to the first embodiment, the user of the receiving terminal can identify the sending terminal that called the receiving terminal even when the phone number of the sending terminal is not disclosed to the user of the receiving terminal. More specifically, since the phone number is not disclosed to the receiving terminal, personal information can be protected. Furthermore, the receiving terminal can identify the sending terminal by using the caller name with the anonymity of the sending terminal being maintained.

Still more specifically, according to the first embodiment, since the phone number is not disclosed to the receiving terminal, the anonymity of the sending terminal can be maintained. The user of the receiving terminal can identify the sending terminal by using the name. Thus, personal information can be protected.

For example, when the user of the sending terminal calls a consumer affairs bureau and the anonymity of the sending terminal is required for some reason, call ID blocking is activated. In this case, a user of the receiving terminal such as a staff member of the consumer affairs bureau does not need personal information of the user of the sending terminal, such as a phone number. However, some service may not be provided unless the user of the sending terminal is identified. To provide a full service, the user of the sending terminal needs to be identified. In such a case, according to the first embodiment, the user of the sending terminal allows the user of the receiving terminal to identify them as a person who called previously. In addition, the user of the receiving terminal can assure that the caller is a person who called previously without acquiring personal information, such as the phone number of the sending terminal.

Furthermore, according to the first embodiment, when the sending terminal makes an obscured call to the receiving terminal, the user of the receiving terminal can identify the sending terminal using the name sent from the sending terminal regardless of whether the receiving terminal stores the name that uniquely identifies the user of the sending terminal.

Still furthermore, according to the first embodiment, by sending the caller name only at the first call, the amount of communications traffic can be reduced.

Second Embodiment

While the first embodiment has been described with reference to the case where a period in which a correspondence between the caller network identification information and the user identification information is valid has no expiration date. It is to be understood that the embodiment is not limited thereto. For example, the expiration date of the correspondence information can be set. Accordingly, a communication system according to a second embodiment employs an expiration date that determines a period in which a correspondence between the caller network identification information and the user identification information is valid.

According to the second embodiment, the "expiration date" used for the communication system is useful in the following case. For example, in order to protect personal information, it is not desirable that personal information such as a phone number is retained in a receiving terminal 200, although the personal information is invisible, after consultation provided by the consumer affairs bureau is completed, and further conversation between the users of the sending terminal and the receiving terminal is not needed. Accordingly, in accordance with the service period provided by an organization using the receiving terminal 200, the expiration date may be set in some models, to a date one month after the user of the sending terminal called for the first time, or a date one week after both users have agreed to terminate the consultation. In another model, an expiration date may be set for the phone number stored in a user identification information storage module 242. After the expiration date of the phone number has passed, the user of the receiving terminal cannot identify the user of the sending terminal corresponding to the expired phone number.

In the communication system according to the second embodiment, when associating caller information with a phone number and storing the information, the user identification information storage module 242 computes an expiration date by using a predetermined period set for the communication system. Thereafter, the user identification information storage module 242 stores the computed expiration date together with the correspondence between the caller information and the phone number.

In the communication system according to the second embodiment, the user identification information storage module 242 of the receiving terminal 200 further stores an expiration date together with the caller network identification information and the user identification information. The expiration date indicates a period in which the correspondence between the caller network identification information and the user identification information is valid. As illustrated in FIG. 11, the user identification information storage module 242 stores an expiration date in association with a correspondence between a caller name and a phone number. In an example illustrated in FIG. 11, the user identification information storage module 242 stores an expiration date "2010/4/1" in association with a correspondence between a caller name "Jane Smith" and a phone number "090-2222-1111". In addition, the user identification information storage module 242 stores an expiration date "2006/12/31" in association with a correspondence between a caller name "Mary Smith" and a phone number "090-2222-2222". Note that the user of the receiving terminal can refer the expiration date. However, the user of the receiving terminal cannot modify the expiration date.

In the communication system according to the second embodiment, the receiving terminal 200 searches for the expiration date stored in association with the caller network identification information by using the caller network identification information received from a sending terminal 100 as a search key so as to acquire the expiration date. The receiving terminal 200 then determines whether the correspondence stored in association with the acquired expiration date is valid or not on the basis of the acquired expiration date. When the receiving terminal 200 receives a connection request in a caller ID blocking call mode from the sending terminal 100, the receiving terminal 200 also receives a telephone number "090-2222-1111" indicating the sending terminal 100 and a phone number obscuring flag. If the obscured call determination module 232 determines that the call is an obscured call, the receiving terminal 200 acquires the expiration date "2010/4/1" stored in the user identification information storage module 242 in association with the phone number "090-2222-1111". Thereafter, the receiving terminal 200 compares the acquired expiration date with a date when the expiration date is acquired (e.g., "2001/1/1" or "2011/12/12"). Assuming that the expiration date is acquired on "2001/1/1", the date the expiration date is acquired does not exceed the expiration date "2010/4/1". Then, the receiving terminal 200 determines that the correspondence between the phone number "090-2222-1111" and the name "Jane Smith" is valid. However, Assuming that the expiration date was acquired on "2010/4/1", the date the expiration date is acquired exceeds the expiration date "2010/4/1". Then, the receiving terminal 200 determines that the correspondence between the phone number and the name is invalid.

In the communication system according to the second embodiment, if the receiving terminal 200 determines that the correspondence between the caller network identification information and the user identification information is valid, the receiving terminal 200 searches for the user identification information stored in the user identification information storage module 242 in association with the caller network identification information, by using the caller network identification information as a search key so as to acquire the user identification information. The receiving terminal 200 then displays only the acquired user identification information on the display module 212.

In the communication system according to the second embodiment, when the user identification information output module 233 determines that the correspondence between the phone number "090-2222-1111" and the user identification information stored in the user identification information storage module 242 is valid on the basis of the expiration date "2010/4/1", the user identification information output module 233 searches the user identification information storage module 242 using the phone number "090-2222-1111" as a search key, and acquires the name "Jane Smith" stored in association with the phone number. The user identification information output module 233 then displays only the name "Jane Smith" on the display module 212. In contrast, if the user identification information output module 233 determines that the correspondence between the phone number "090-2222-1111" and the user identification information stored in the user identification information storage module 242 is invalid on the basis of the expiration date "2010/4/1", the user identification information output module 233 displays only a message "No information" on the display module 212.

In the communication system according to the second embodiment, the "expiration date" is data can be referenced by the user of the receiving terminal. However, the invention is not limited thereto. For example, the "expiration date" may be data that cannot be referenced by the user of the receiving terminal.

In the communication system according to the second embodiment, a "expiration date" is maintained in the form of information indicating a date. However, the invention is not limited thereto. Any information that indicates an expiration date can be employed. For example, information indicating that a correspondence is valid for the next 10 days may be stored in place of the expiration date.

Figure 12:
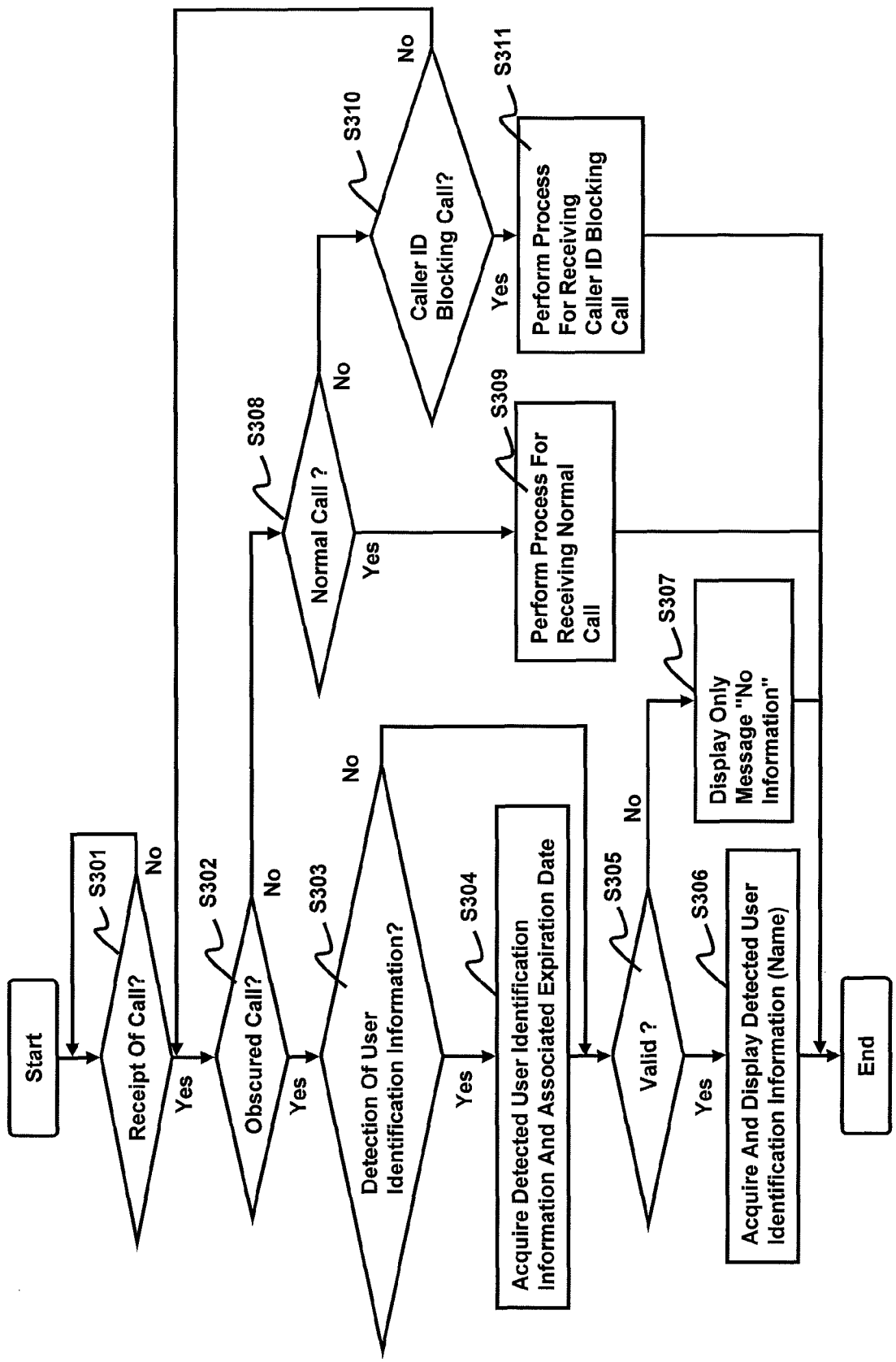
FIG. 12 is a flow chart of an exemplary process of receiving a connection request performed by a receiving terminal according to the second embodiment.

Reception Process of Connection Request Performed by Receiving Terminal of Second Embodiment An exemplary reception process of a connection request performed by a receiving terminal of the second embodiment is described next with reference to FIG. 12. FIG. 12 is a flow chart of the exemplary reception process of a connection request performed by a receiving terminal according to the second embodiment.

According to the second embodiment, as illustrated in FIG. 12, if the receiving terminal receives a call and determines that the call is an obscured call ("YES" at step S301 and "YES" at step S302), the receiving terminal searches for the user identification information (step S303) That is, when the receiving terminal 200 receives a phone number "090-2222-1111" and obscured call information together with the connection request, the receiving terminal 200 searches for the caller name and the expiration date stored in the user identification information storage module 242 in association with the phone number "090-2222-1111" by using the phone number "090-2222-1111" as a search key (refer to FIG. 11).

In the communication system according to the second embodiment, if the receiving terminal detects the user identification information and the expiration date ("YES" at step S303), the receiving terminal acquires the detected user identification information and the associated expiration date (step S304). That is, the receiving terminal acquires the date "2010/4/1" associated with the correspondence between the name "Jane Smith" and the phone number "090-2222-1111". Thereafter, the receiving terminal determines whether the correspondence between the acquired phone number and the name is valid or not (step S305). That is, the receiving terminal compares a date when the expiration date is acquired with the date "2010/4/1" so as to determine whether the date the expiration date is acquired exceeds the date "2010/4/1". If the correspondence is valid ("YES" at step S305), that is, if a date when the expiration date is acquired does not exceed the date "2010/4/1", the receiving terminal acquires the detected user identification information and displays the caller name (step S306). Thereafter, the process is completed. In contrast, if the correspondence is invalid ("NO" at step S305), that is, if a date the expiration date is acquired exceeds the date "2010/4/1", the receiving terminal displays only a message "No information" (step S307). Thereafter, the process is completed.

Note that steps S301 and S302 shown in FIG. 12 correspond to steps S201 and S202 shown in FIG. 9, respectively. Step S303 shown in FIG. 12 corresponds to step S206 shown in FIG. 9. Steps S308 to S311 shown in FIG. 12 correspond to steps S209 to S212 shown in FIG. 9, respectively.

As noted above, according to the second embodiment, after the expiration date has passed, the sending terminal cannot be identified by the user of the receiving terminal. Thus, the personal information can be securely protected, as compared with a technique that does not employ an expiration date.

According to the second embodiment, in a case such as after consultation provided by the consumer affairs bureau is completed and further conversation between the users of the sending terminal and the receiving terminal is not needed, the sending terminal cannot be identified by the user of the receiving terminal after the expiration date has passed. In this way, personal information can be protected.

Third Embodiment

In the above-described embodiments, the operations performed by the receiving terminal 200 when the receiving terminal 200 sends a connection request to the sending terminal 100 has not been described. According to a third embodiment, the case where the receiving terminal 200 sends a connection request to the sending terminal 100 by using a correspondence between the caller network identification information and the user identification information is described.

In a communication system according to the third embodiment, upon recognizing a selection of predetermined user identification information stored in a user identification information storage module 242, the receiving terminal 200 searches the user identification information storage module 242 for the caller network identification information associated with the user identification information by using the selected user identification information as a search key so as to acquire the caller network identification information. Thereafter, the receiving terminal 200 sends a connection request to the sending terminal 100 identified by the caller network identification information.

For example, in the communication system according to the third embodiment, as illustrated in FIG. 11, upon recognizing a selection of the name "Jane Smith" stored in the user identification information storage module 242, the receiving terminal 200 searches the user identification information storage module 242 by using the name "Jane Smith" as a search key so as to acquire the phone number "090-2222-1111". Thereafter, the receiving terminal 200 sends a connection request to the sending terminal 100 identified by the phone number "090-2222-1111".

In addition, in the communication system according to the third embodiment, when the receiving terminal 200 sends a connection request using the correspondence between the caller network identification information and the user identification information stored in the user identification information storage module 242 to the sending terminal, and the receiving terminal 200 determines that the correspondence between the caller network identification information and the user identification information is valid, the communication system performs a control so as to permit the call. However, when the receiving terminal 200 determines that the correspondence between the caller network identification information and the user identification information is invalid, the communication system performs control so as not to permit the call.

In the communication system according to the third embodiment, as illustrated in FIG. 11, upon recognizing a selection of the name "Jane Smith", the receiving terminal 200 searches the user identification information storage module 242 by using the selected name "Jane Smith" as a search key so as to acquire the phone number "090-2222-1111". At the same time, the receiving terminal 200 acquires an expiration date "2010/4/1" stored in association with the selected name "Jane Smith" and determines whether the correspondence between the name "Jane Smith" and the phone number "090-2222-1111" is valid. If the receiving terminal 200 determines that the correspondence is valid based on the acquired expiration date, the receiving terminal 200 is permitted to send a connection request to the sending terminal 100 identified by the phone number "090-2222-1111". However, if the receiving terminal 200 determines that the correspondence is invalid based on the acquired expiration date, the receiving terminal 200 is not permitted to send a connection request to the sending terminal 100 identified by the phone number "090-2222-1111".

In the third embodiment, the receiving terminal 200 is permitted to make a call to the sending terminal 100 only when the correspondence between the caller network identification information and the user identification information is valid. However, the invention is not limited thereto. For example, even when it is determined that the correspondence between the caller network identification information and the user identification information is invalid, the call may be permitted. For example, if the correspondence is stored in the user identification information storage module 242, the call may be permitted. However, if new registration is made by the user of the sending terminal after the registration is stored in the user identification information storage module 242, a call based on the old correspondence may not be permitted.

In the third embodiment, the permission of the call is determined by using an expiration date. However, the invention is not limited thereto. The permission of the call need not be determined by using an expiration date. For example, even the receiving terminal 200 in the communication system according to the first embodiment that does not employ an expiration date may send a connection request to the sending terminal 100 using a correspondence between the caller network identification information and the user identification information.

Figure 13:
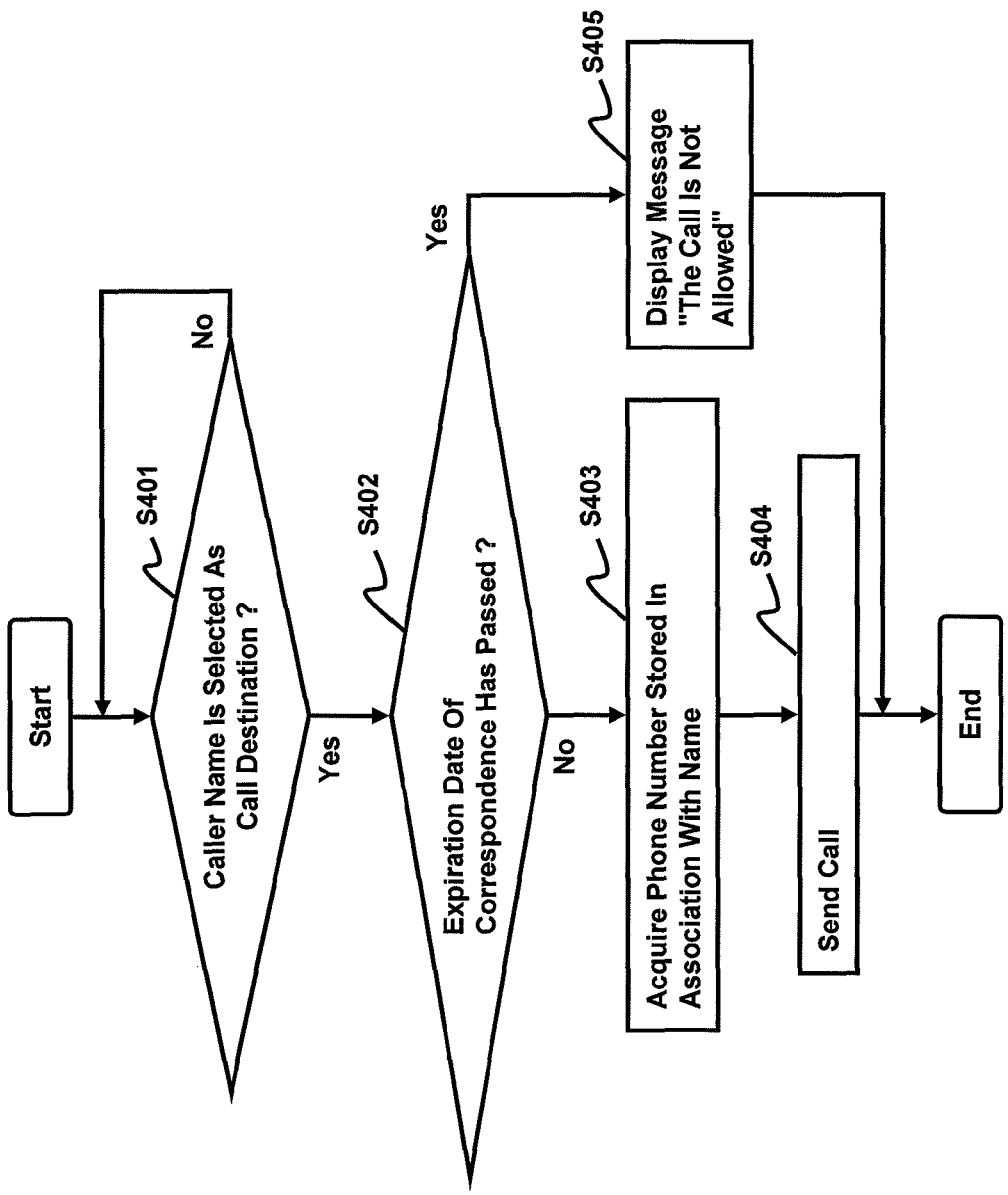
FIG. 13 is a flow chart illustrating an exemplary process of a connection request call performed by a receiving terminal according to a third embodiment.

Process of Sending Connection Request Performed by Receiving terminal of Third Embodiment An exemplary process of sending a connection request performed by a receiving terminal according to the third embodiment is described next with reference to FIG. 13. FIG. 13 is a flow chart illustrating the exemplary process of sending a connection request performed by a receiving terminal according to the third embodiment. The receiving terminal prestores user identification information including an expiration date "2010/4/1" and a caller name "Jane Smith" associated with a phone number "090-2222-1111".

According to the third embodiment, when a caller name is selected as a call destination (step S401), the receiving terminal 200 determines whether the expiration date of the correspondence between the caller name and the phone number has passed (step S402). Upon recognizing a selection of the name "Jane Smith", the receiving terminal 200 acquires the expiration date "2010/4/1" stored in association with the name "Jane Smith", and determines whether the correspondence between the name "Jane Smith" and the phone number "090-2222-1111" is valid. If the expiration date of the correspondence has not passed ("NO" at step S402), for example, if the receiving terminal 200 recognizes the selection of the name "Jane Smith" on "2001/1/1", the receiving terminal 200 acquires the phone number stored in association with the name "Jane Smith" (step S403) and makes a call (step S404). That is, by using the name "Jane Smith" as a search key, the receiving terminal 200 acquires the phone number "090-2222-1111" from the user identification information storage module 242. Subsequently, the receiving terminal 200 sends a connection request to the sending terminal 100 identified by the phone number "090-2222-1111". Thereafter, the call process is completed.

In contrast, according to the third embodiment, if the expiration date of the correspondence has passed ("YES" at step S402), the receiving terminal 200 displays a message "The call is not allowed" (step S405). For example, if the receiving terminal 200 recognizes the selection of the name "Jane Smith" on "2011/12/12", the receiving terminal 200 is not allowed to send a connection request to the sending terminal 100 identified by the phone number "090-2222-1111". Thereafter, the call process is completed.

As noted above, according to the third embodiment, personal information can be securely protected and the anonymity cannot be protected, as compared with a technique that does not employ an expiration date. In addition, when an emergency call is needed from, for example, a health care service center in the period of consultation (i.e., before the expiration date has passed), the receiving terminal can call back the sending terminal.

Fourth Embodiment

In the above-described embodiments using an expiration date, the operations to be performed after a correspondence between the caller network identification information and the user identification information becomes invalid has not been described. The invention is not limited to retention of the correspondence. For example, the correspondence between the caller network identification information and the user identification information may be deleted after the expiration date.

Figure 14:
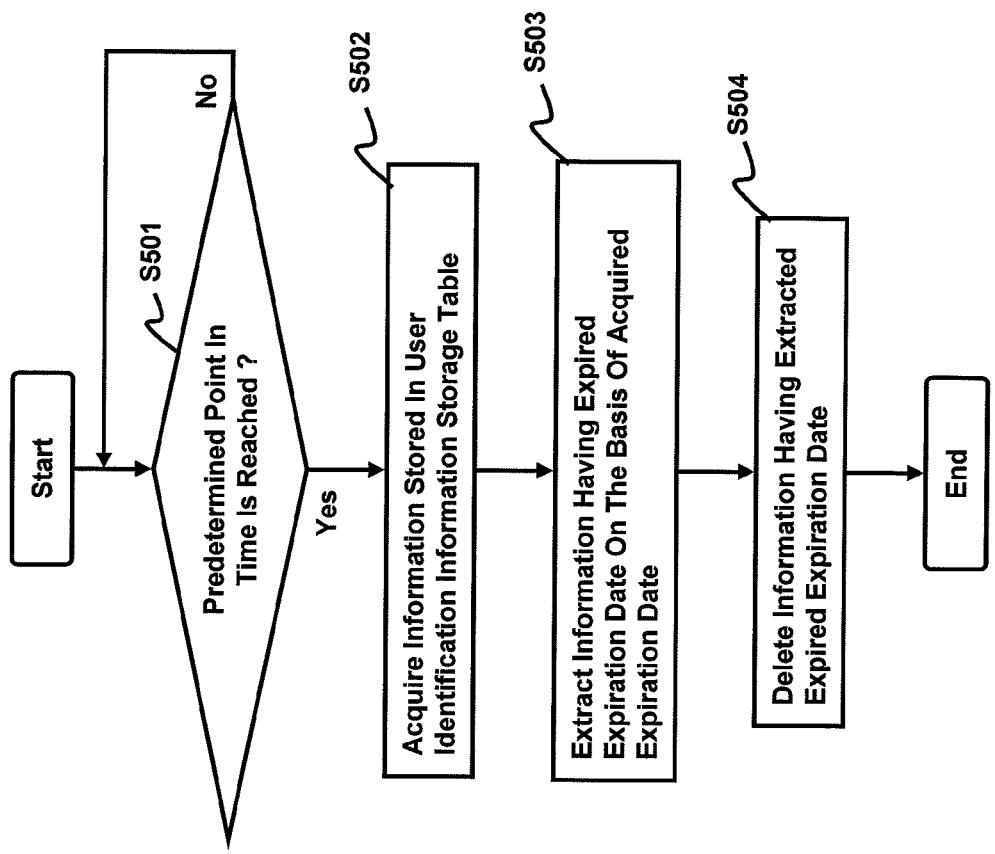
FIG. 14 is a flow chart illustrating an exemplary process for deleting user identification information performed by a receiving terminal using an expiration date according to a fourth embodiment.

According to a fourth embodiment, as illustrated in FIG. 14, after a correspondence the caller network identification information and the user identification information becomes invalid, the correspondence is deleted. In the fourth embodiment, the correspondence is deleted at a predetermined point in time. FIG. 14 is a flow chart illustrating an exemplary process for deleting the user identification information performed by a receiving terminal using an expiration date, according to the fourth embodiment.

As illustrated in FIG. 14, according to the fourth embodiment, when a predetermined point in time is reached ("YES" at step S501), a communication system acquires information stored in a user identification information storage table (step S502). That is, more specifically, the communication system acquires a correspondence between a caller name and a phone number stored in a user identification information storage module 242 and the corresponding expiration date. For example, as illustrated in FIG. 11, the communication system acquires a correspondence between a caller name "Jane Smith" and a phone number "090-2222-1111" and the expiration date "2010/4/1". In addition, the communication system acquires a correspondence between a caller name "Mary Smith" and a phone number "090-2222-2222" and the expiration date "2006/12/31".

Subsequently, the communication system according to the fourth embodiment extracts information having an expired expiration date on the basis of the acquired expiration date (step S503). For example, the communication system acquires a correspondence between a caller name "Jane Smith" and a phone number "090-2222-1111" having an expiration date "2010/4/1" on the date "2007/4/1". The communication system further acquires a correspondence between a caller name "Mary Smith" and a phone number "090-2222-2222" having an expiration date "2006/12/31" on the date "2007/4/1". At that time, the communication system extracts the expiration date "2006/12/31" of the correspondence that is invalid at the acquisition time. The communication system then extracts the correspondence between a caller name "Mary Smith" and a phone number "090-2222-2222" that corresponds to the expiration date "2006/12/31".

Thereafter, the communication system according to the fourth embodiment deletes the information having the extracted expired expiration date (step S504). That is, a receiving terminal 200 deletes, from the user identification information storage module 242, the correspondence between the caller network identification information and the user identification information that is determined to be invalid. As illustrated in FIG. 11, if the receiving terminal 200 extracts an expired expiration date at a predetermined point in time, at an acquisition time, the receiving terminal 200 deletes the correspondence between the caller name and the phone number corresponding to the expiration date and the expiration date itself. If the receiving terminal 200 extracts the expired expiration date "2006/12/31" at an acquisition time, the receiving terminal 200 deletes the correspondence between the caller name "Mary Smith" and a phone number "090-2222-2222" and the expiration date "2006/12/31".

While the fourth embodiment has been described with reference to the communication system that deletes the correspondence at a predetermined point in time, the communication system is not intended to be limited to such deletion. For example, deletion may be performed after immediate determination instead of determination at a predetermined point in time.

As noted above, according to the fourth embodiment, personal information can be securely protected, as compared with the case where the correspondence is maintained in the receiving terminal after the expiration date has passed.

More specifically, the receiving terminal deletes personal information (e.g., a phone number) after the expiration date has passed, although the personal information is invisible to the user of the receiving terminal. In this way, the personal information can be further securely protected.

Fifth Embodiment

In the above-described embodiments, a method for newly registering or deleting the user identification information, the caller network identification information, and the expiration date is not described. However, the invention is not limited thereto. For example, the information may be newly registered, modified, and deleted.

Figure 15:
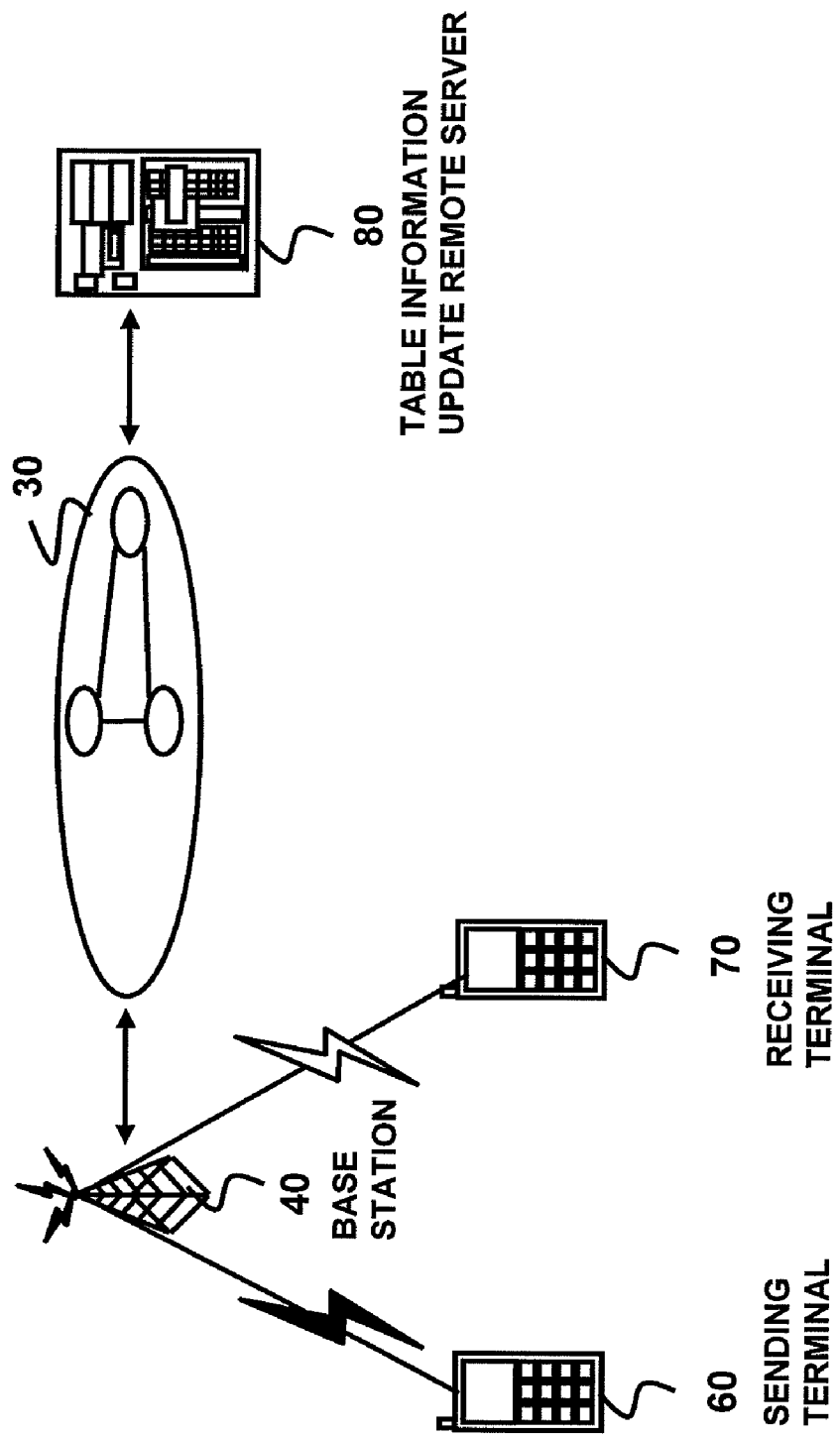
FIG. 15 is a diagram illustrating the features of a communication system according to a fifth embodiment.
Figure 16:
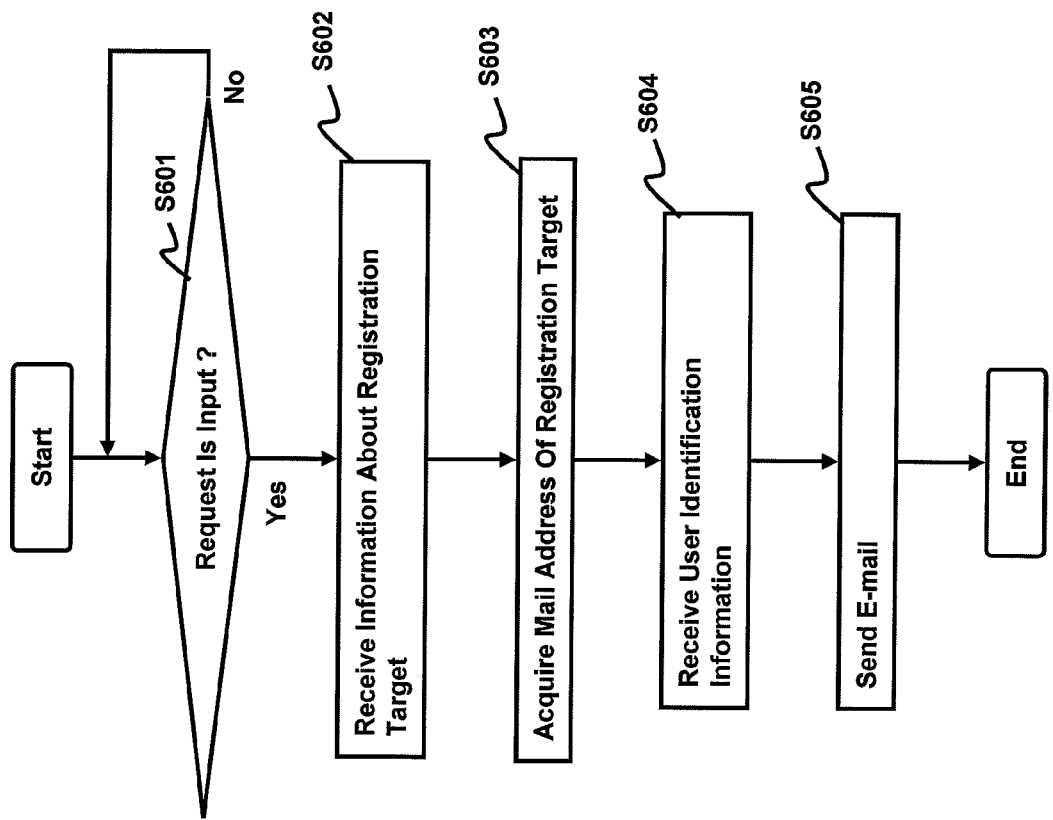
FIG. 16 is a flow chart illustrating an exemplary process for requesting modification of user identification information according to the fifth embodiment.
Figure 18:
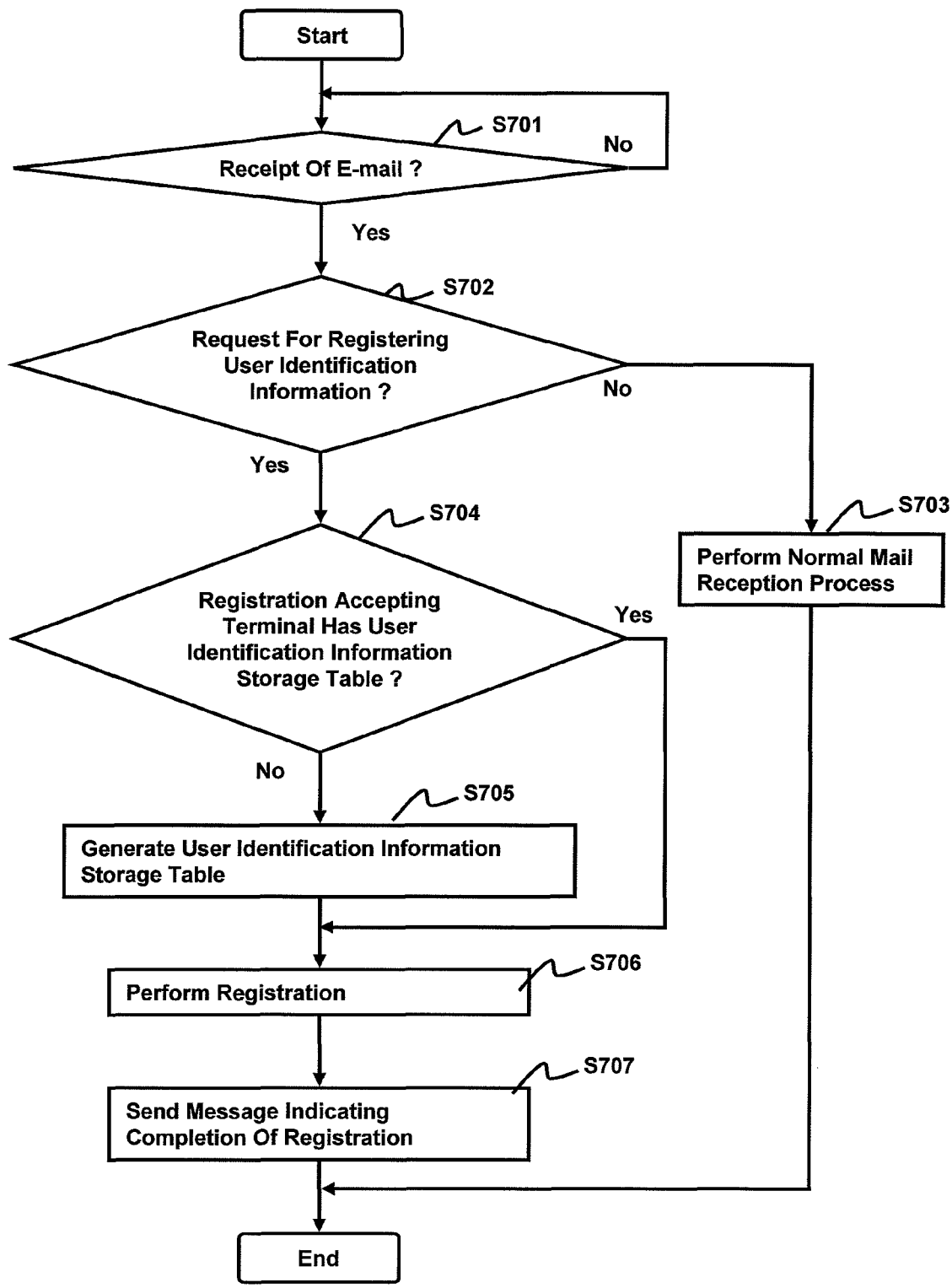
FIG. 18 is a flow chart illustrating an exemplary process for accepting the modification of the user identification information according to the fifth embodiment.
Figure 19:
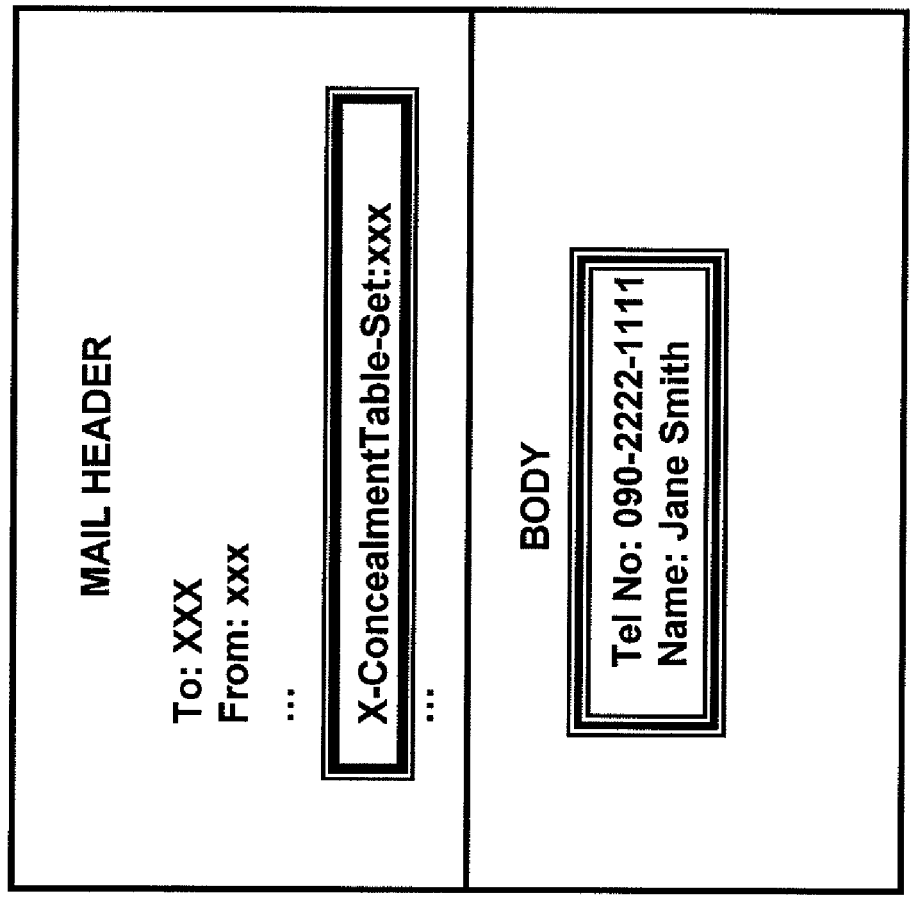
FIG. 19 is a diagram illustrating the exemplary process for accepting the modification of the user identification information according to the fifth embodiment.

According to a fifth embodiment, a method for newly registering, modifying, and deleting the user identification information and/or the caller network identification information and/or the expiration date is described next with reference to FIGS. 15 to 19. FIG. 15 is a diagram illustrating a communication system according to the fifth embodiment. FIG. 16 is a flow chart illustrating an exemplary process for requesting modification of the user identification information according to the fifth embodiment. FIG. 17 is a diagram illustrating the exemplary process for requesting modification of the user identification information according to the fifth embodiment. FIG. 18 is a flow chart illustrating an exemplary process for accepting the modification of the user identification information according to the fifth embodiment. FIG. 19 is a diagram illustrating the exemplary process for accepting the modification of the user identification information according to the fifth embodiment.

According to the fifth embodiment, as illustrated in FIG. 15, a communication system includes a registering terminal (e.g., the sending terminal) 60 identified by the phone number "090-2222-1111", a registration accepting terminal (e.g., the receiving terminal) 70 identified by the phone number "090-3333-1111", and a table information update remote server 80. In the following description, the registration accepting terminal 70 accepts new registration of user identification information using an e-mail sent from the registering terminal 60 via the table information update remote server 80.

That is, in the communication system having such a configuration according to the fifth embodiment, the registering terminal 60 determines whether a request for registration of user identification information is input (step S601). That is, the registering terminal 60 determines whether requests for new registration, an update, or deletion of user identification information, caller network identification information, or an expiration date are input. If at least one of these requests is input ("YES" at step S601), the registering terminal 60 receives information about a registration target selected by the receiving terminal (step S602). For example, as illustrated in a screen (1) of FIG. 17, the registering terminal 60 receives a name "John Smith" as a registration target and acquires the phone number "090-3333-1111" stored in the phone number storage module 141 in association with the name "John Smith". The registering terminal 60 then displays the phone number on the display 112.

Subsequently, in the communication system according to the fifth embodiment, the registering terminal 60 acquires a mail address of the registration target (step S603). For example, the registering terminal 60 acquires the mail address stored in the phone number storage module 141 in association with the name "John Smith". Thereafter, the registering terminal 60 receives the user identification information (step S604). That is, the registering terminal 60 receives the new registration request, the update request from terminal 70, or the deletion request for the user identification information, the caller network identification information, or the expiration date. As illustrated in a screen (2) of FIG. 17, when the registering terminal 60 receives a new registration request, the registering terminal 60 further receives a caller name "Jane Smith" and a phone number "090-2222-1111". The registering terminal 60 then sends out an e-mail or a cryptographic e-mail (step S605). That is, as illustrated in a screen (3) of FIG. 17, the registering terminal 60 displays a selection section including a button "YES" that instructs transmission of an e-mail and a button "NO" that instructs cancellation of transmission of the e-mail. If the button "YES" is selected, the registering terminal 60 sends the e-mail to the table information update remote server 80. Thereafter, the request transmission process is completed.

Subsequently, in the communication system according to the fifth embodiment, the registration accepting terminal 70 receives at least one of a new registration request, an update request, and a deletion request. The new registration request is used for requesting registration of user identification information, caller network identification information, and an expiration date in the user identification information storage module 242. The update request is used for requesting update of user identification information, caller network identification information, and an expiration date in the user identification information storage module 242. The deletion request is used for requesting deletion of user identification information, caller network identification information, and an expiration date in the user identification information storage module 242.

More specifically, in the communication system according to the fifth embodiment, the registration accepting terminal 70 receives at least one of a new registration request, an update request, and a deletion request from the registering terminal 60 connected to the network 30 via the network 30 and the table information update remote server 80.

For example, in the communication system according to the fifth embodiment, upon receiving an e-mail ("YES" at step S701), the registration accepting terminal 70 determines whether the request is a request for registering the user identification information (step S702). That is, as illustrated in FIG. 19, the registration accepting terminal 70 determines whether the e-mail includes an information item "X-ConcealmentTable-Set". If the registration accepting terminal 70 determines that the request is not a request for registering the user identification information ("NO" at step S702), for example, if the e-mail does not include the information item "X-ConcealmentTable-Set", the registration accepting terminal 70 performs a normal mail reception process (step S703). Thereafter, the mail reception process is completed.

In contrast, in the communication system according to the fifth embodiment, if the registration accepting terminal 70 determines that the request is a request for registering the user identification information ("YES" at step S702), for example, if the e-mail includes the information item "X-ConcealmentTable-Set", the registration accepting terminal 70 determines whether the registration accepting terminal 70 has the user identification information storage table (refer to FIG. 6) (step S704). If the registration accepting terminal 70 has the user identification information storage table ("YES" at step S704), the registration accepting terminal 70 immediately performs registration (step S706). If the registration accepting terminal 70 does not have the user identification information storage table ("NO" at step S704), the registration accepting terminal 70 generates the user identification information storage table (step S705) and, subsequently, the registration accepting terminal 70 performs registration (step S706). That is, upon receiving a new registration request, the registration accepting terminal 70 performs the registration in user identification information storage unit. Upon receiving an update request, change receiving unit performs update of information in the user identification information storage unit. Upon receiving a deletion request, deletion receiving unit performs deletion of information in the user identification information storage unit. For example, the registration accepting terminal 70 stores a correspondence between the caller name "Jane Smith" and the phone number "090-2222-1111" in the user identification information storage table. Thereafter, the registration accepting terminal 70 sends a message indicating completion of the registration (step S707). That is, the registration accepting terminal 70 or the table information update remote server 80 sends an e-mail indicating completion of the registration to the registering terminal 60 that sent the registration request. Thereafter, the registration process is completed.

In the communication system according to the fifth embodiment, the registration accepting terminal 70 receives a request, such as a new registration request, from the registering terminal 60 connected to the network 30 via the network 30. However, the invention is not limited to such an application. More specifically, the registration accepting terminal 70 may be directly connected to a predetermined apparatus unconnected to the network 30, without using the network 30 so as to receive at least one of a new registration request, an update request, and a deletion request from the apparatus.

For example, in the communication system according to the fifth embodiment, the predetermined apparatus unconnected to the network 30 may be installed at a predetermined location and may function as a non-contact reader/writer apparatus including a reader module that receives a request (e.g., a new registration request) sent from the registering terminal 60 to the registration accepting terminal 70, and a writer module that transfers the request received by the reader module to the registration accepting terminal 70, or may function as a non-contact writer apparatus including only the writer module. The registration accepting terminal 70 may be directly connected to the apparatus so as to receive the request without using the network 30.

In addition, according to the fifth embodiment, while the communication system has been described with reference to the registration accepting terminal 70 not displaying a message indicating that the registration accepting terminal 70 is processing the request (e.g., a new registration request) during the process (e.g., steps S705 and S706), the invention is not limited thereto. For example, the registration accepting terminal 70 may display the message "Generating the user identification information table" on the display 112 during the process at step S705 and may display the message "Updating data" on the display 112 during the process at step S706.

Furthermore, according to the fifth embodiment, the communication system has been described with reference to a configuration including the registering terminal 60, the registration accepting terminal 70, and the table information update remote server 80. An update request is processed via the table information update remote server 80. However, the invention is not limited thereto. For example, the registering terminal 60 may directly send an update request to the registration accepting terminal 70 without using the table information update remote server 80.

Still furthermore, according to the fifth embodiment, while the communication system has been described with reference to an update request and an update process using an e-mail, the invention is not limited thereto. For example, an update request may be received using a voice and may be processed. Alternatively, an update request may be received using a Web site and may be processed.

As described above, in the communication system according to the fifth embodiment, apparatuses other than the receiving terminal can freely set a name and a phone number required for performing an obscured call in the receiving terminal. For example, a member or a manager of an organization can register another member with the receiving terminal. Thus, the member or the manager of an organization can register another member with the receiving terminal in accordance with the number of members of the organization or the policy of the organization.

Furthermore, in the communication system according to the fifth embodiment, the apparatus can freely set a name and a phone number required for performing an obscured call in the receiving terminal. For example, a member or a manager of an organization can register the members of the organization with the receiving terminal in one go. Thus, the member of an organization or the manager of an organization can easily perform registration in accordance with the number of members of the organization or the policy of the organization.

Still furthermore, in the communication system according to the fifth embodiment, the receiving terminal can receive at least one of a new registration request, an update request, and a deletion request from a predetermined apparatus unconnected to a network without using the network. Accordingly, the apparatus can freely set a name and a phone number required for performing an obscured call in the receiving terminal. For example, by installing a dedicated terminal, a name can be easily registered without using the network.

Sixth Embodiment

While the embodiment has been described in connection with the first to fifth embodiments of the various configurations, it is to be understood that other similar embodiments may be used or modifications and additions may be made to the described embodiment for performing the same function of the embodiment without deviating therefrom. Accordingly, a communication system according to a sixth embodiment is described below.

(1) Storing Caller Name for Each Receiving Terminal

For example, while the first embodiment has been described with reference to the case where a plurality of receiving terminals 200 are present, but the sending terminal 100 prestores only one caller name in the call information storage module 142 and the prestored caller name is used for mailing called, the invention is not limited thereto. For example, a caller name may be stored in the call information storage module 142 for each of the receiving terminals 200.

More specifically, in a communication system according to a sixth embodiment, the sending terminal 100 stores user identification information related to sending terminal in association with each of callee network identification information items. The sending terminal 100 then searches the user identification information stored in the call information storage module 142 in association with a particular of the callee network identification information items by using one of the callee network identification information items as a search key so as to acquire the user identification information. The sending terminal 100 sends the acquired user identification information together with a call request. If user identification information is input, the input user identification information such as a name of the user may be used first.

For example, as illustrated in FIG. 20, in the communication system according to the sixth embodiment, the sending terminal 100 stores, in the call information storage module 142, a caller name for each of call destinations that uniquely identify the receiving terminals 200 for an obscured call. In an example shown in FIG. 20, the sending terminal 100 stores a call destination "John Smith" in association with a caller name "Jane Smith", and stores a call destination "Bob Smith" in association with a caller name "Mary Smith". In addition, the sending terminal 100 stores a call destination "Bill Smith" in association with a caller name "Beth Smith".

Subsequently, in the communication system according to the sixth embodiment, when the sending terminal 100 cannot receive input of a name which is to be sent together with a connection request, if the name "John Smith" is selected, the sending terminal 100 searches the call information storage module 142 by using the selected name "John Smith" as a search key so as to acquire the caller name "Jane Smith" associated with the selected name "John Smith". The sending terminal 100 then sends the caller name "Jane Smith" together with a connection request.

In this way, in the communication system according to the sixth embodiment, the user of the sending terminal 100 can store a caller name in the sending terminal 100 in advance. Thus, the number of operations required for sending an obscured call can be reduced, thereby providing an easy operation of the obscured call. In addition, the user of the sending terminal 100 can change the user identification information or the name of a caller by input the changed user identification information. Therefore, the user of the sending terminal 100 can change the caller name as needed.

For example, when a name is input by the user of the sending terminal, the communication system according to a sixth embodiment can use the name input by the user of the sending terminal 100. The name may include a real name, a false name, a nickname, only a second name, only a first name, or a name of the district of residence.

In addition, in the communication system according to the sixth embodiment, the user identification information used for a user of the receiving terminal to identify the sending terminal can be set for each of the receiving terminals and can be prestored. Thus, the degree of protection of personal information can be freely determined for each of the receiving terminals.

For example, in the communication system according to a sixth embodiment, if the degree of the anonymity needs to be increased, the user of the sending terminal allows the user of the receiving terminal to identify the sending terminal by using a false name. In contrast, if the degree of the anonymity does not need to be increased, the user of the sending terminal allows the user of the receiving terminal to identify the sending terminal by using a real name.

(2) Use of Profile Information

In addition, while the first embodiment has been described with reference to the case where the sending terminal 100 sends a name stored in the call information storage module 142, or the prestored name to be stored in the user identification information storage module 242, to the receiving terminal 200, the invention is not limited thereto. For example, a caller name may be sent by using profile information stored in the sending terminal 100.

For example, in the communication system according to the sixth embodiment, the sending terminal 100 stores user information registered therewith. For example, the sending terminal 100 prestores profile information including a name "Jane Smith" indicating the user of the sending terminal 100 and a phone number "090-2222-1111".

Subsequently, in the communication system according to the sixth embodiment, the sending terminal 100 receives an input of user identification information which is to be sent together with a connection request. If user identification information is input, the sending terminal 100 sends the input user identification information together with a connection request. However, if user identification information is not input, the sending terminal 100 sends the user information stored in a predetermined storage module as the user identification information together with a connection request.

Figure 21:
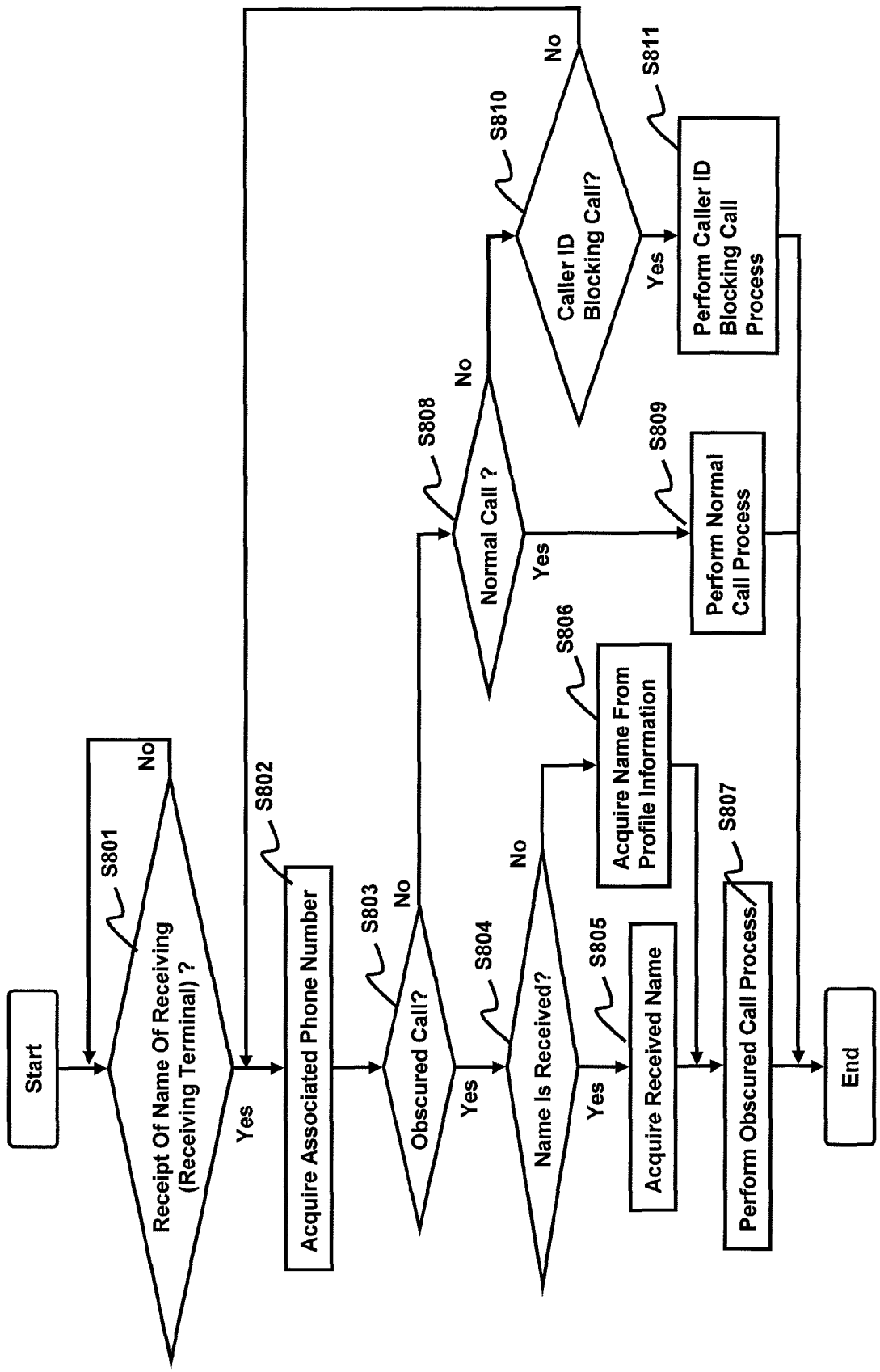
FIG. 21 is a diagram illustrating an exemplary process of a connection request call using profile information according to the sixth embodiment.

For example, in an example shown in FIG. 21, in the communication system according to the sixth embodiment, if user identification information which is to be sent together with a connection request is not input ("NO" at step S804), the sending terminal 100 acquires a name from the profile information (step S806). For example, the sending terminal 100 sends the name "Jane Smith" and the phone number "090-2222-1111" stored in the profile information.

Note that steps S801 to S805 shown in FIG. 21 correspond to steps S101 to S105 shown in FIG. 7, respectively. Steps S807 to S811 shown in FIG. 21 correspond to steps S107 to S111 shown in FIG. 7, respectively.

As described above, in the communication system according to the sixth embodiment, the user of the receiving terminal can identify the sending terminal with personal information kept obscured. In addition, if a name is not input by the user of the sending terminal, the sending terminal can acquire the name from the profile information stored in the sending terminal and send the name. In this way, the user of the sending terminal can perform an obscured call without inputting the name to the receiving terminal.

(3) Others

While the fourth embodiment has been described with reference to the case where sending a connection request from the receiving terminal 200 to the sending terminal 100 is permitted only before an expiration date has been reached, the embodiment is not limited thereto. For example, in the embodiments that does not use an expiration date, sending a connection request may be permitted if a caller name and a phone number are stored in the user identification information storage module 242.

(4) System Configuration

Some of or all of the above-described processes that are automatically activated may be manually activated. For example, the new registration request may be manually and directly input to the receiving terminal 200. Alternatively, some of or all of the above-described processes that are manually activated may be automatically activated using existing techniques. For example, in the above-described embodiments, the caller name sent together with a connection request is input by the user. However, the caller name may be automatically generated and may be sent. Additionally, in the processing procedures in the foregoing descriptions and drawings (e.g., FIGS. 7, 9, 12, and 21), the decision as to whether the call is an obscured call, the control procedures, the particular names, and the information including various data and parameters shown in FIGS. 1 to 22 can be freely changed unless otherwise noted. For example, the order of the decision as to whether the call is an obscured call (e.g., the process at step S103), the decision as to whether the call is a normal call (e.g., the process at step S108), and the decision as to whether the call is a caller ID blocking call (e.g., the process at step S110) may be freely changed.

Furthermore, the components illustrated in the drawings are functionally conceptual, and therefore, the components need not be physically the same as those illustrated. That is, particular forms of the components are not necessarily the same as illustrated. Some of or all of the components may be functionally or physically distributed or integrated in accordance with the load of the components or actual usage environments. Examples of distribution include separation of the user identification information receiving module 133 shown in FIG. 2. Examples of integration include integration of the sending terminal 100 and the receiving terminal 200.

Note that the integration of the sending terminal 100 and the receiving terminal 200 that a terminal including the functions of the sending terminal 100 and the receiving terminal 200 may be produced. Here, the case where, for example, a sending terminal according to the present embodiment performs an obscured call to a receiving terminal not according to the embodiment is described. For example, when performing a caller ID blocking call, the sending terminal sends a "obscured call flag" and a "caller phone number" together with the transmitted data. Since the receiving terminal does not include the processing module according to the embodiment, the receiving terminal ignores the obscured call flag and the caller phone number and performs processing in a caller ID blocking call mode. Accordingly, even when an obscured call is sent to a receiving terminal not according to the embodiment, the caller phone number is not output from the receiving terminal, and therefore, personal information can be protected.

(5) Programs of Communication System

Figure 22:
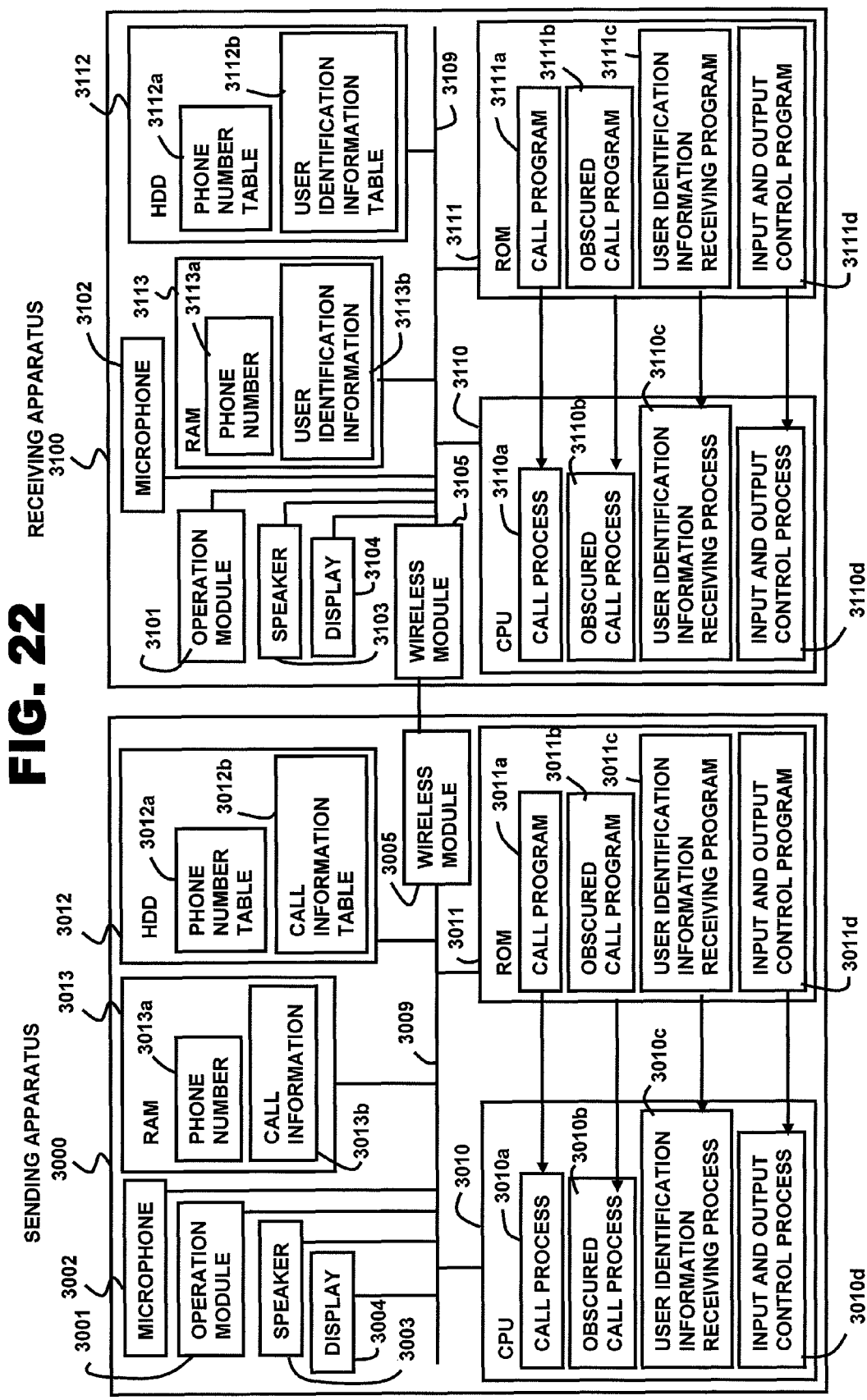
FIG. 22 illustrates exemplary programs of the communication system according to the first embodiment.

While the first embodiment has been described with reference to the case where the various processing is performed by hardware logic, the embodiment is not limited thereto. For example, the various processing is performed by executing predefined programs using a computer. An example of a computer that executes a communication system control program so as to provide functions the same as those of the first embodiment is described next with reference to FIG. 22. FIG. 22 illustrates programs of the communication system according to the first embodiment.

As shown in FIG. 22, according to the first embodiment, a communication system includes a caller apparatus 3000 and a callee apparatus 3100. The caller apparatus 3000 includes an operation module 3001, a microphone 3002, a speaker 3003, a display 3004, a wireless module 3005, a central processing module (CPU) 3010, a read-only memory (ROM) 3011, a hard disk drive (HDD) 3012, and a random access memory (RAM) 3013, which are connected to each other via a bus 3009.

The ROM 3011 prestores control programs providing functions that are the same as those of the call module 131, the obscured call module 132, the user identification information receiving module 133, and the input and output I/F module 120 described in the first embodiment. That is, as illustrated in FIG. 22, the ROM 3011 prestores a call program 3011*a*, an obscured call program 3011*b*, a user identification information receiving program 3011*c*, and an input and output control program 3011*d*. Note that, like the components of the communication system shown in FIG. 2, these programs 3011*a* to 3011*d* may be integrated or separated as needed.

The CPU 3010 reads out the programs 3011*a* to 3011*d* from the ROM 3011 and executes the readout programs. Thus, as illustrated in FIG. 22, the programs 3011*a* to 3011*d* function as a call process 3010*a*, an obscured call process 3010*b*, a user identification information receiving process 3010*c*, and an input and output control process 3010*d*, respectively. The processes 3010*a* to 3010*d* correspond to the call module 131, the obscured call module 132, the user identification information receiving module 133, and the input and output I/F module 120 shown in FIG. 2, respectively.

The HDD 3012 includes a phone number table 3012*a* and a call information table 3012*b*. The phone number table 3012*a* corresponds to the phone number storage module 141. The call information table 3012*b* corresponds to the call information storage module 142. The CPU 3010 reads out the phone number table 3012*a* and the call information table 3012*b* from the HDD 3012 and loads the tables into the RAM 3013. Thereafter, the CPU 3010 executes the communication system control program using data in the phone number table 3012*a* and the call information table 3012*b* loaded into the RAM 3013.

In addition, as illustrated in FIG. 22, the callee apparatus 3100 includes an operation module 3101, a microphone 3102, a speaker 3103, a display 3104, a wireless module 3105, a CPU 3110, a ROM 3111, an HDD 3112, and a RAM which are connected to each other via a bus 3109.

The ROM 3111 prestores control programs providing functions that are the same as those of the call receiving module 231, the obscured call determination module 232, the user identification information output module 233, the user identification information storing module 234, and the input and output I/F module 220 described in the first embodiment. That is, as illustrated in FIG. 22, the ROM 3111 prestores an obscured call determination program 3111*a*, a call receiving program 3111*b*, a user identification information output program 3111*c*, a user identification information storing program 3111*d*, and an input and output control program 3111*e*. Note that, like the components of the communication system shown in FIG. 2, these programs 3111a to 3111e may be integrated or separated as needed.

The CPU 3110 reads out the programs 3111a to 3111e from the ROM 3111 and executes the readout programs. Thus, as illustrated in FIG. 22, the programs 3111a to 3111e function as an obscured call determination process 3110a, a call receiving process 3110b, a user identification information output process 3110c, a user identification information storing process 3110d, and an input and output control process 3110e, respectively. The processes 3110a to 3110e correspond to the call receiving module 231, the obscured call determination module 232, the user identification information output module 233, the user identification information storing module 234, and the input and output I/F module 220 shown in FIG. 2, respectively.

The HDD 3112 includes a phone number table 3112a and a user identification information table 3112b. The phone number table 3112a corresponds to the phone number storage module 241. The user identification information table 3112b corresponds to the user identification information storage module 242. The CPU 3110 reads out the phone number table 3112a and the user identification information table 3112b from the HDD 3112 and loads the tables into the RAM 3113. Thereafter, the CPU 3110 executes the communication system control program using the phone number table 3112a and the user identification information table 3112b loaded into the RAM 3113.

It should be noted that the programs 3011a to 3011d and the programs 3111a to 3111e need not be stored in the ROMs in advance. For example, the programs may be stored in a removable physical medium mounted in the communication system, such as a memory card, a flexible disk, a compact disk-read only memory (CD-ROM), an magnetooptical (MO) disk, a digital versatile disk (DVD), or an IC card, or in a fixed physical medium set inside or outside the communication system, such as an HDD. Alternatively, the programs may be stored in other computers (or servers) connected to the communication system using a public line, the Internet, a local area network (LAN), or a wide area network (WAN). The communication system may read out the programs and execute the programs.

As described above, according to some aspect of the embodiments, a communication system, a method for controlling a communication system, and a communication system control program are advantageous for the following communication system including a sending terminal and a receiving terminal which are uniquely identified by network identification information in a network. Upon receiving callee network identification information indicating the receiving terminal as the network identification information from a user of the sending terminal, the sending terminal sends a connection request requesting for connection with the receiving terminal to the receiving terminal. The receiving terminal receives the connection request via the network. In particular, the communication system, the method for controlling a communication system, and the communication system control program are suitable for achieving a communication system that allows a user of the receiving terminal to identify the sending terminal without revealing the network identification information about the sending terminal to the user of the receiving terminal.

What is claimed is:

1. A communication system comprising:
   a sending terminal comprising:
      a storage module for storing an identification information for identifying said sending terminal, and
      a calling module for transmitting a connection request comprising said identification information and an identification obscuration information for obscuring said identification information; and
   a receiving terminal comprising:
      a storage module for storing identification information identifying a terminal and a user information corresponding to said identification information, said user information being different from said identification information, and
      a controlling module for executing a process comprising:
         detecting said identification obscuration information of said connection request, and
         displaying at said receiving terminal said user information corresponding to said identification information of said connection request retrieved from said storage module of said receiving terminal.

2. The communication system according to claim 1, wherein said identification information is a phone number of said sending terminal.

3. The communication system according to claim 1, said process of said controlling module further comprising,
   detecting said identification information corresponding to said user information when said user information is inputted by said user of said receiving terminal, and
   transmitting said connection request comprising an identification information of said receiving terminal to said network.

4. The communication system according to claim 3, wherein said storage module further stores a period information indicative of a validity of a correspondence between said identification information of said sending terminal and said user information, and
   said process further comprising, transmitting said connection request when said period information is less than predetermined value.

5. The communication system according to claim 4, said process further comprising, deleting said identification information of said sending terminal, said user information and said period information when said period information is not less than predetermined value.

6. The communication system according to claim 1, wherein said calling module further transmits said user information, and said process further comprising, storing said user information to said storage module.

7. A terminal in a communication system for communicating between the other terminals having an identification information for identifying uniquely via a network, said terminal comprising:
   a storage module for storing said identification information said terminal and a user information corresponding to said identification information, said user information being different from said identification information of said sending terminal, and
   a controlling module for executing according to a process comprising:
   receiving a connection request comprising said identification information of said other terminals and a identification obscuration information for obscuring said identification information of said other terminals from said network;
   detecting said identification obscuration information of said connection request, and
   displaying said user information corresponding to said identification information of said other terminals of said connection request retrieved from said storage module.

8. A method for communicating between a sending terminal and a receiving terminal, said sending terminal and said receiving terminal having an identification information for identifying uniquely in a network, said receiving terminal storing said identification information of said sending terminal and a user information corresponding to said identification information of said sending terminal, said user information being different from said identification information of said sending terminal, the method comprising the steps of:

transmitting a connection request comprising said identification information of said sending terminal and a identification obscuration information for obscuring said identification information of said sending terminal from said sending terminal to said network; and detecting said identification obscuration information of said connection request by said receiving terminal, and displaying at said receiving terminal said user information corresponding to said identification information of said sending terminal of said connection request.

* * * * *